United States Patent
White et al.

(10) Patent No.: US 11,428,889 B2
(45) Date of Patent: *Aug. 30, 2022

(54) TOOLING AND METHOD FOR MANUFACTURING A FIBER OPTIC ARRAY

(71) Applicant: CommScope Connectivity UK Limited, Swindon (GB)

(72) Inventors: Gordon John White, Gloucester (GB); Christopher Charles Taylor, Cheltenham Glos (GB); David Patrick Murray, Bristol (GB)

(73) Assignee: CommScope Connectivity UK Limited, Dorcan (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/344,240

(22) Filed: Jun. 10, 2021

(65) Prior Publication Data
US 2022/0011532 A1 Jan. 13, 2022

Related U.S. Application Data

(63) Continuation of application No. 15/822,613, filed on Nov. 27, 2017, now Pat. No. 11,036,023, which is a
(Continued)

(51) Int. Cl.
*G02B 6/44* (2006.01)
*G02B 6/36* (2006.01)
(Continued)

(52) U.S. Cl.
CPC ............ *G02B 6/4475* (2013.01); *G02B 6/368* (2013.01); *G02B 6/3612* (2013.01); *G02B 6/406* (2013.01);
(Continued)

(58) Field of Classification Search
None
See application file for complete search history.

(56) References Cited

U.S. PATENT DOCUMENTS 4,305,642 A * 12/1981 Bloodworth, Jr. ... G02B 6/3878
81/9.51
4,989,946 A 2/1991 Williams et al.
(Continued)

FOREIGN PATENT DOCUMENTS

EP 0587336 A2 3/1994
EP 1102095 A1 5/2001
(Continued)

OTHER PUBLICATIONS

International Search Report and Written Opinion for Application No. PCT/EP2015/067514 dated Nov. 4, 2015.

*Primary Examiner* — Chad H Smith
(74) *Attorney, Agent, or Firm* — Merchant & Gould P.C.

(57) ABSTRACT

A fixture is for forming a fiber optic array that defines a plurality of discrete fibers extending from a spaced-apart arrangement to a consolidated arrangement wherein the fibers are layered next to each other for a further ribbonizing process. The fixture includes a pair of contact blades that are configured to slide along a direction transverse to the longitudinal axes of the fibers for consolidating the fibers.

8 Claims, 32 Drawing Sheets

Related U.S. Application Data continuation of application No. 14/816,254, filed on Aug. 3, 2015, now Pat. No. 9,829,667.

(60) Provisional application No. 62/033,287, filed on Aug. 5, 2014.

(51) Int. Cl.
*G02B 6/40* (2006.01)
*G02B 6/38* (2006.01)

(52) U.S. Cl.
CPC .......... *G02B 6/4403* (2013.01); *G02B 6/3897* (2013.01); *G02B 6/4453* (2013.01); *G02B 6/4471* (2013.01)

(56) References Cited

U.S. PATENT DOCUMENTS

| | | | |
|---|---|---|---|
| 5,146,532 A | 9/1992 | Hodge | |
| 5,155,785 A | 10/1992 | Holland et al. | |
| 5,204,925 A | 4/1993 | Bonanni et al. | |
| 5,231,685 A * | 7/1993 | Hanzawa | G02B 6/4292 385/139 |
| 5,292,390 A | 3/1994 | Burack et al. | |
| 5,327,513 A | 7/1994 | Nguyen et al. | |
| 5,402,512 A * | 3/1995 | Jennings | G02B 6/3839 385/59 |
| 5,636,310 A | 6/1997 | Walles | |
| 5,664,037 A | 9/1997 | Weidman | |
| 5,734,777 A | 3/1998 | Merriken et al. | |
| 5,878,179 A | 3/1999 | Schricker | |
| 5,970,196 A | 10/1999 | Greveling et al. | |
| 5,974,214 A | 10/1999 | Shacklette et al. | |
| 5,981,064 A | 11/1999 | Burack et al. | |
| 6,005,991 A | 12/1999 | Knasel | |
| 6,224,269 B1 | 5/2001 | Engstrand et al. | |
| 6,226,431 B1 | 5/2001 | Brown et al. | |
| 6,229,933 B1 | 5/2001 | Curzio et al. | |
| 6,259,844 B1 | 7/2001 | Logan et al. | |
| 6,295,400 B1 | 9/2001 | Shahid | |
| 6,301,413 B1 | 10/2001 | Bringuier | |
| 6,321,019 B1 | 11/2001 | Shibuya et al. | |
| 6,351,590 B1 | 2/2002 | Shahid | |
| 6,356,690 B1 | 3/2002 | McAlpine et al. | |
| 6,377,738 B1 | 4/2002 | Anderson et al. | |
| 6,421,493 B1 | 7/2002 | Burek et al. | |
| 6,442,323 B1 | 8/2002 | Sorosiak | |
| 6,445,866 B1 | 9/2002 | Clairadin et al. | |
| 6,464,404 B1 | 10/2002 | Robinson et al. | |
| 6,554,483 B1 | 4/2003 | Sun et al. | |
| 6,594,436 B2 | 7/2003 | Sun et al. | |
| 6,600,860 B2 | 7/2003 | Sun et al. | |
| 6,619,853 B2 | 9/2003 | Grois et al. | |
| 6,668,124 B2 | 12/2003 | Kondo | |
| 6,690,862 B1 | 2/2004 | Rietveld | |
| 6,808,444 B1 | 10/2004 | Kuprin et al. | |
| 6,850,671 B2 | 2/2005 | Carnevale et al. | |
| 6,873,773 B2 | 3/2005 | Sun et al. | |
| 7,461,981 B2 | 12/2008 | Yow, Jr. et al. | |
| 7,738,760 B2 | 6/2010 | Fredrickson et al. | |
| 8,342,755 B2 | 1/2013 | Nhep | |
| 8,690,593 B2 | 4/2014 | Anderson et al. | |
| 9,223,094 B2 | 12/2015 | Schneider | |
| 11,036,023 B2 * | 6/2021 | White | G02B 6/3612 |
| 2004/0062488 A1 | 4/2004 | Wood | |
| 2015/0253514 A1 | 9/2015 | Murray | |

FOREIGN PATENT DOCUMENTS

| | | |
|---|---|---|
| EP | 1103832 A2 | 5/2001 |
| EP | 1067418 A1 | 10/2001 |
| FR | 2749406 A1 | 12/1997 |
| GB | 2367902 A | 10/2000 |
| JP | H07281052 A | 10/1995 |
| JP | H1068853 A | 3/1998 |
| JP | H10339818 A | 12/1998 |
| JP | 2001255421 A | 9/2001 |
| JP | 2002253341 A | 9/2002 |
| JP | 2002254306 A | 9/2002 |
| JP | 2007318741 A | 12/2007 |
| JP | 2010019895 A | 1/2010 |
| JP | 2010239535 A | 10/2010 |
| KR | 1020050034103 A | 4/2005 |
| WO | 9913367 A2 | 3/1999 |
| WO | 9946621 A1 | 9/1999 |
| WO | 0161317 A1 | 8/2001 |
| WO | 2014052441 A1 | 4/2014 |

\* cited by examiner

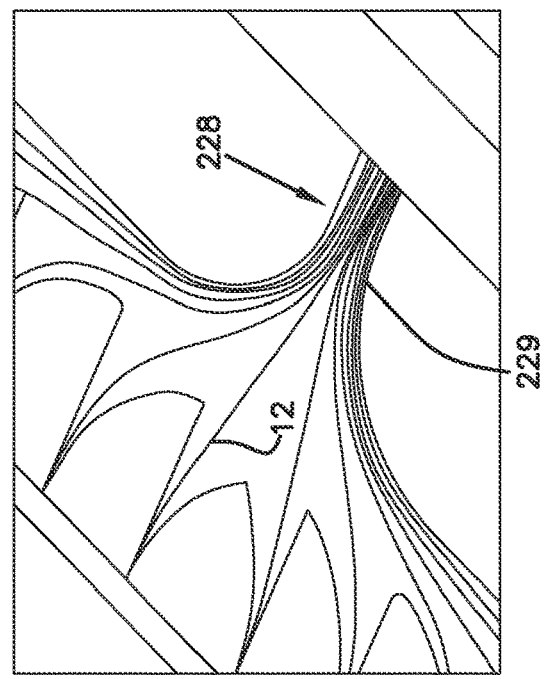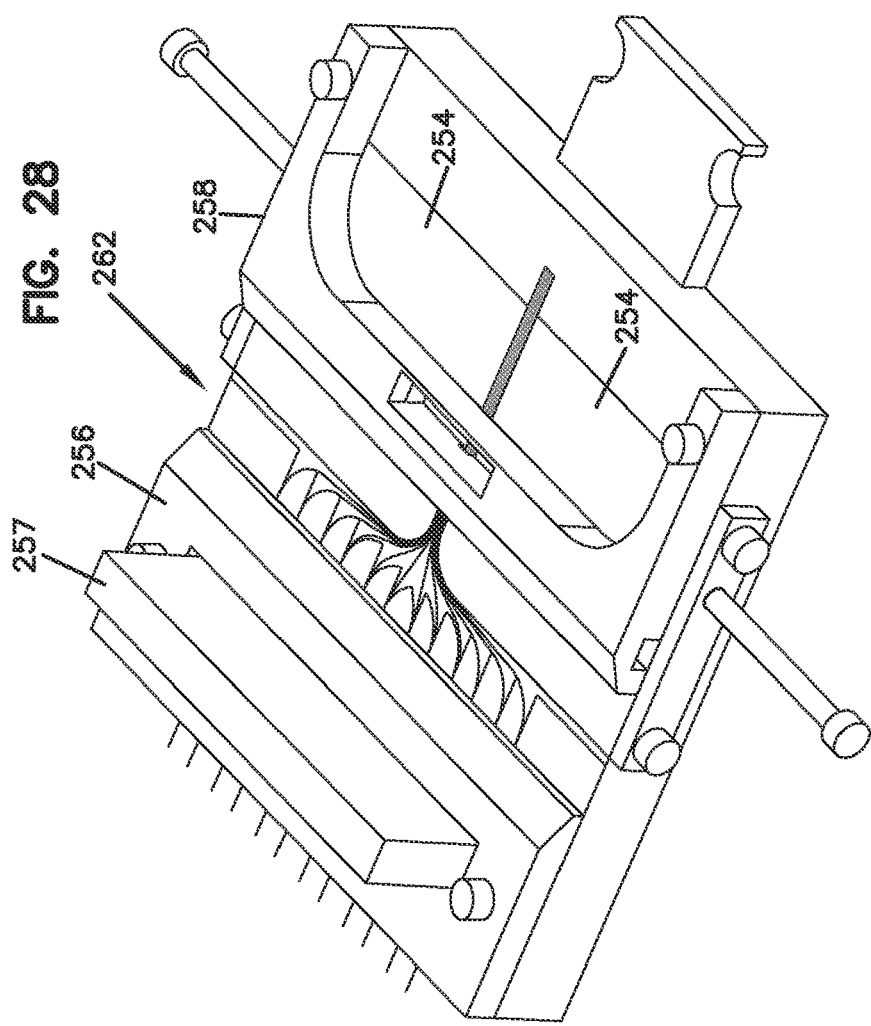

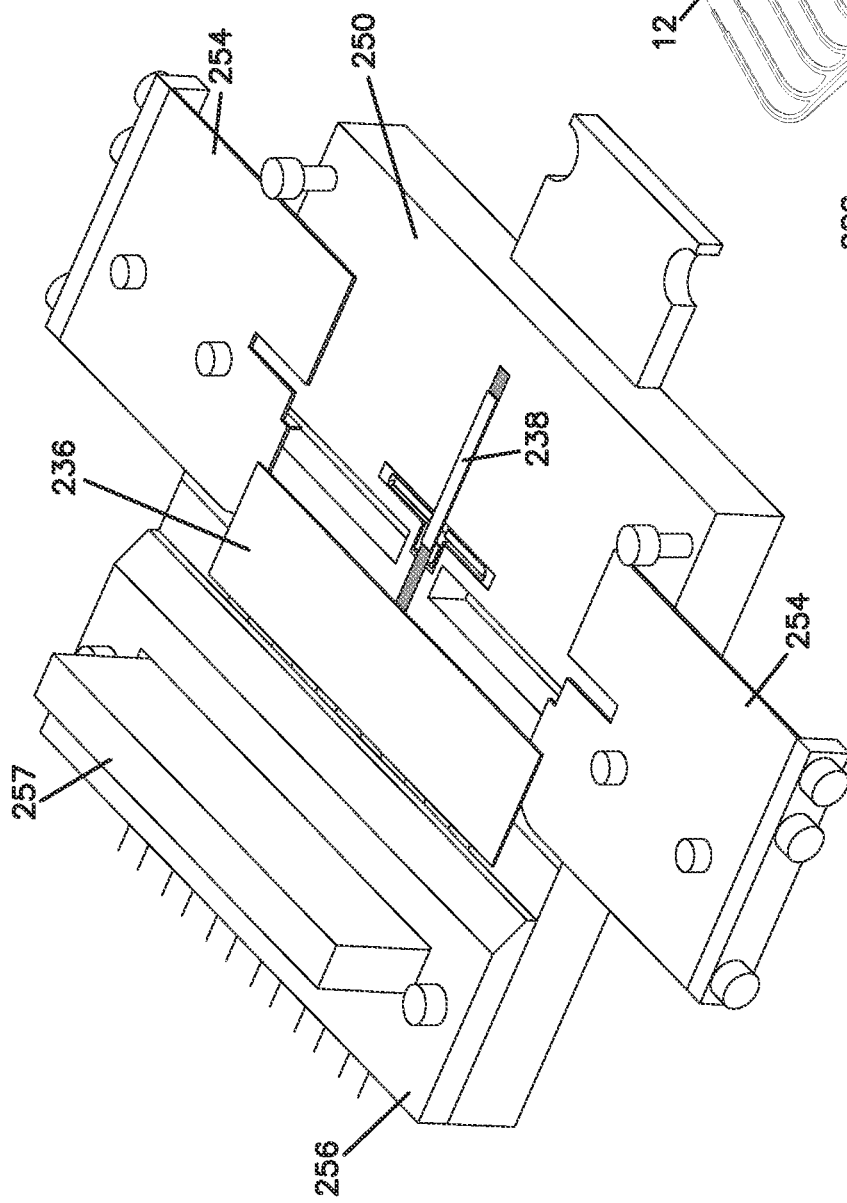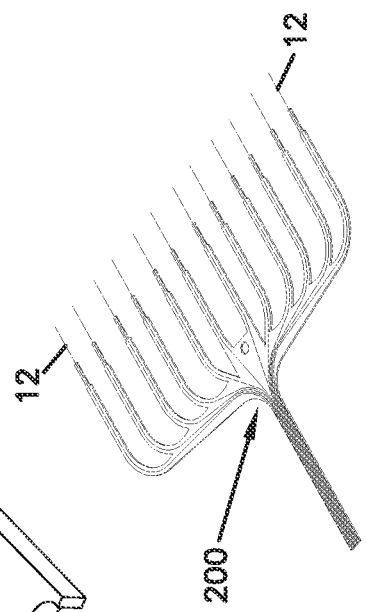

TOOLING AND METHOD FOR MANUFACTURING A FIBER OPTIC ARRAY

CROSS-REFERENCE TO RELATED APPLICATION

The present application is a continuation of U.S. patent application Ser. No. 15/822,613, filed Nov. 27, 2017, now U.S. Pat. No. 11,036,023; which is a continuation of U.S. patent application Ser. No. 14/816,254, filed Aug. 3, 2015, now U.S. Pat. No. 9,829,667; which claims the benefit of U.S. Provisional Patent Application Ser. No. 62/033,287, filed Aug. 5, 2014, which applications are hereby incorporated by reference in their entireties.

BACKGROUND OF THE INVENTION

As demand for telecommunications increases, fiber optic networks are being extended in more and more areas. Management of the cables, ease of installation, and ease of accessibility for later management are important concerns. As a result, there is a need for fiber optic devices which address these and other concerns.

SUMMARY

An aspect of the present disclosure relates to tooling and methods for manufacturing a fiber optic array that may be housed in further optical distribution equipment. According to certain embodiments, such optical distribution equipment may include fiber optic cassettes configured for relaying a fiber optic signal from a signal input location to a signal output location or a plurality of signal output locations. According to one specific example, such a fiber optic cassette may comprise a body defining a front and an opposite rear. A cable entry location may be defined on the body (e.g., the rear) for a multi-fiber cable to enter the cassette, and a cable exit location may be defined on the body (e.g., the front) for a plurality of fibers from the multi-fiber cable to exit the cassette. The multi-fiber cable may form at least a part of the fiber optic array to be housed within the fiber optic cassette. According to one example embodiment, a plurality of optical fibers from the cable are to extend into the cassette and form terminations adjacent the front of the body as part of the fiber optic array. The fiber optic array of the present disclosure may include a substrate that is to be positioned between the cable entry location and the terminations adjacent the front of the body of the cassette, wherein the substrate rigidly supports the plurality of optical fibers. Each of the terminations adjacent the front of the body of the cassette may include a ferrule and a ferrule hub supporting the ferrule. The terminations of the fiber optic array may be positioned at the front of the body of the cassette in structures such as fiber optic adapters for further connectivity to signal carrying outside fiber optic connectors.

According to the present disclosure, another aspect relates to a fiber optic array comprising a plurality of optical fibers, a substrate for supporting the plurality of optical fibers, the substrate defining a first end and a second end, and a plurality of spaced-apart channels defining parallel portions at the first end of the substrate and a fiber clamp provided at the second end of the substrate. The plurality of optical fibers are positioned on the substrate such that the fibers extend from being spaced-apart via the channels to a consolidated arrangement wherein the fibers are layered next to each other. The fiber clamp secures the consolidated fibers at the second end of the substrate.

According to another aspect, the present disclosure is directed to a fixture for forming a fiber optic array that defines a plurality of discrete fibers extending from a spaced-apart arrangement to a consolidated arrangement wherein the fibers are layered next to each other for a further ribbonizing process. The fixture comprises a pair of contact blades that are configured to slide along a direction transverse to the longitudinal axes of the fibers for consolidating the fibers.

According to another aspect, the present disclosure is directed to a method for forming a fiber optic array that defines a plurality of discrete fibers extending from a spaced-apart arrangement to a consolidated arrangement wherein the fibers are layered next to each other for a further ribbonizing process, the method comprising laying the fibers within spaced-apart channels defined on a fixture, the channels having parallel portions; moving a pair of contact blades on the fixture along a direction transverse to the longitudinal axes of the fibers to abut and to consolidate the fibers; and securing together the fibers at both the spaced-apart portion of the array and the consolidated portion of the array. According to one example embodiment, the channels are defined by a substrate that is provided as a removable insert of the fixture.

According to another example embodiment, the method further comprises securing the formed fiber optic array between two polymeric sheets to form a flexible optical circuit.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIGS. 24-31 illustrate an example method and tooling for forming a fiber optic array similar to that shown in FIGS. 1 and 23, except that the array formed by the method illustrated in FIGS. 24-31 is an example of a preform that can be further processed into a flexible optical circuit; and FIG. 32 shows a flexible optical circuit formed from the array manufactured by the inventive method and tooling illustrated in FIGS. 24-31.

DETAILED DESCRIPTION

Figure 1:
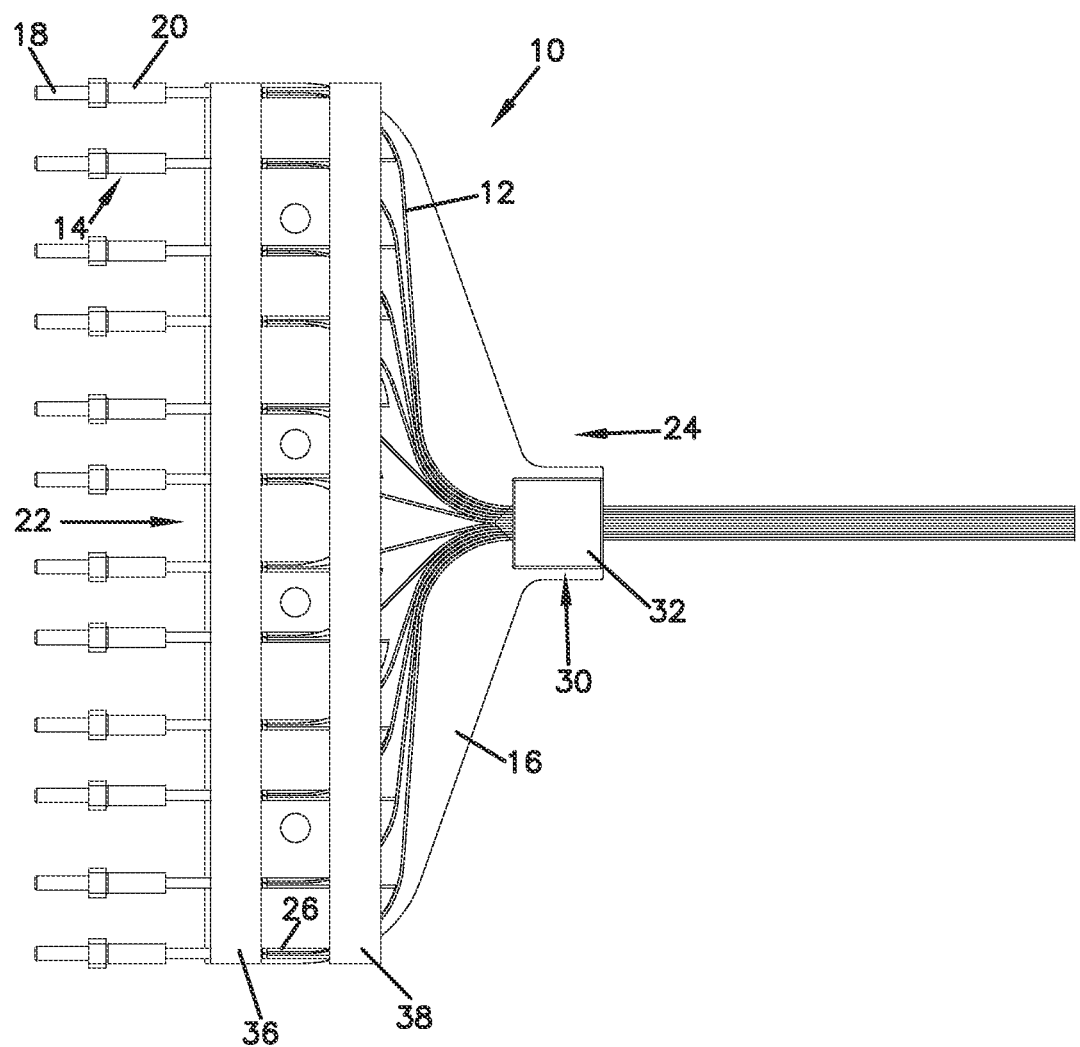
FIG. 1 illustrates an example embodiment of an inventive fiber optic array formed according to the inventive methods and tooling of the present disclosure.

The present disclosure is directed generally to tooling and methods for manufacturing a fiber optic array 10 that may be housed in optical distribution equipment such as fiber optic cassettes.

According to certain embodiments, such fiber optic cassettes may be configured for relaying a fiber optic signal from a signal input location to a signal output location or a plurality of signal output locations. According to one specific example, such a fiber optic cassette may comprise a body defining a front and an opposite rear. A cable entry location may be defined on the body (e.g., the rear) for a multi-fiber cable to enter the cassette, and a cable exit location may be defined on the body (e.g., the front) for a plurality of fibers from the multi-fiber cable to exit the cassette.

The multi-fiber cable may form at least a part of the fiber optic array 10 to be housed within the fiber optic cassette. According to one example embodiment, a plurality of optical fibers 12 from the cable are to extend into the cassette and form terminations 14 adjacent the front of the body as part of the fiber optic array 10. As will be discussed in further detail below, the fiber optic array 10 of the present disclosure may further include a substrate 16 that is to be positioned between the cable entry location and the terminations 14 adjacent the front of the body of the cassette, wherein the substrate 16 rigidly supports the plurality of optical fibers 12.

Each of the terminations 14 defined by the array that become positioned adjacent the front of the body of the cassette may include a ferrule 18 and a ferrule hub 20 supporting the ferrule 18. The terminations 14 of the fiber optic array 10 may be positioned at the front of the body of the cassette in structures such as fiber optic adapters for further connectivity to signal carrying outside fiber optic connectors.

As noted above, the fiber optic cassettes that are configured to house the fiber optic arrays 10 formed via the tooling and the methods of the present disclosure are designed to relay multiple fibers 12 which terminate at a rear connector, such as an MPO style connector, to a plurality of ferrules 18 positioned at a generally front portion of the cassette. Such fiber optic cassettes, thus, provide a transition housing or support between multi-fibered connectors, such as the MPO style connectors having MT ferrules, and single or dual fiber connectors, such as LC or SC type connectors.

Examples of fiber optic cassettes that may house fiber optic arrays 10 formed in accordance with the present disclosure are disclosed and further described in International Publication Nos. WO 2014/052441 and WO 2014/052446, the entire disclosures of which are incorporated herein by reference.

As will be described in further detail below, some of the embodiments of the fiber optic arrays manufactured according to the present disclosure may form parts of flexible optical circuits. According to one example embodiment, the fiber optic arrays manufactured according to the present disclosure may be arrays that are provided as preforms that can be formed into flexible optical circuits with further processing.

Flexible optic circuits are configured for transitioning between multi-fibered connectors positioned at one end of a piece of fiber optic equipment such as a cassette and single or dual connectors positioned at an opposite end of the cassette. Flexible optical circuits are passive optical components that comprise one or more (typically, multiple) optical fibers imbedded on a flexible sheet or substrate, such as a Mylar™ or other flexible polymer material. Commonly, although not necessarily, one end face of each fiber is disposed adjacent one longitudinal end of the flexible optical circuit substrate, and the other end face of each fiber is disposed adjacent the opposite longitudinal end of the flexible optical circuit substrate. The fibers extend past the longitudinal ends of the flexible optical circuit (commonly referred to as pigtails) so that they can be terminated to optical ferrules or optical connectors, which can be coupled to fiber optic cables or other fiber optic components through mating optical connectors.

Flexible optical circuits essentially comprise one or more fibers sandwiched between two flexible sheets of material, such as Mylar™ or another polymer. An epoxy may be included between the two sheets in order to adhere them together. Alternately, depending on the sheet material and other factors, the two sheets may be heated above their melting point to heat-weld them together with the fibers embedded between the two sheets.

Examples of fiber optic cassettes that house flexible optical circuits, at least portions of which are formed according to the present disclosure are described in further detail in International Publication Nos. WO 2014/052441 and WO 2014/052446, the entire disclosures of which have been incorporated herein by reference.

Now referring to FIG. 1, an example of a fiber optic array 10 that has been manufactured via the tooling and the methods of the present disclosure is illustrated.

As seen in the example depicted in FIG. 1, the fiber optic array 10 includes the support substrate 16 (may also be referred to as an insert with respect to the tooling described in the present disclosure). The support substrate 16 defines a front end 22 and a rear end 24. The front end 22 defines a plurality of channels 26 for supporting fiber pigtails 12. The depicted example of the fiber optic array 10 shows the fiber pigtails 12 as having been terminated to fiber optic ferrules 18 that are supported by ferrule hubs 20. It should be noted that the ferrules 18 terminated to the ends of the fibers 12 that extend from the front end 22 of the substrate 16 may become parts of conventional or non-conventional fiber optic connectors. It should be noted that the term "non-conventional connector" may refer to a fiber optic connector that is not of a conventional type such as an LC or SC connector and one that has generally not become a recognizable standard footprint for fiber optic connectivity in the industry. Such conventional or non-conventional connectors may relay the signals to further connectors via structures such as fiber optic adapters that may be formed as part of the cassettes that house the arrays 10 of the present disclosure.

In the depicted embodiment of the fiber optic array 10, the channels 26 at the front end 22 of the substrate 16 are sized to frictionally receive and secure the buffer tube portions of the optical fibers 12. Termination of the fibers 12 extending from the front end 22 of the substrate 16 to form the pigtails may include securing of the buffer tubes to the ferrule hubs 20. Examples of methods for terminating an optical fiber to a fiber optic ferrule is described and illustrated in International Publication Nos. WO 2014/052441 and WO 2014/052446, the entire disclosures of which have been incorporated herein by reference.

It should be noted that the methods described in International Publication Nos. WO 2014/052441 and WO 2014/052446 relate to the termination of optical fibers that are part of flexible optical circuits. However, similar principals may be used for terminating fibers 12 that are not part of a flexible optical circuit in forming the pigtails depicted in FIG. 1.

Still referring to FIG. 1, the channels 26 at the front end 22 of the substrate 16 are configured to transition the fibers 12 to a fiber consolidation point 28 at the rear end 24 of the substrate 16. The channels 26 define curved rear portions 40. The curvature of the channels 26 are designed to protect the minimum bend radius requirements of the fibers 12 as the fibers 12 extend from the front end 22 to the rear end 24 of the substrate 16.

At the fiber consolidation point 28 at the rear end 24 of the substrate 16, the fiber optic array 10 defines a fiber clamp 30 for clamping the consolidated fibers 12.

Figure 2:
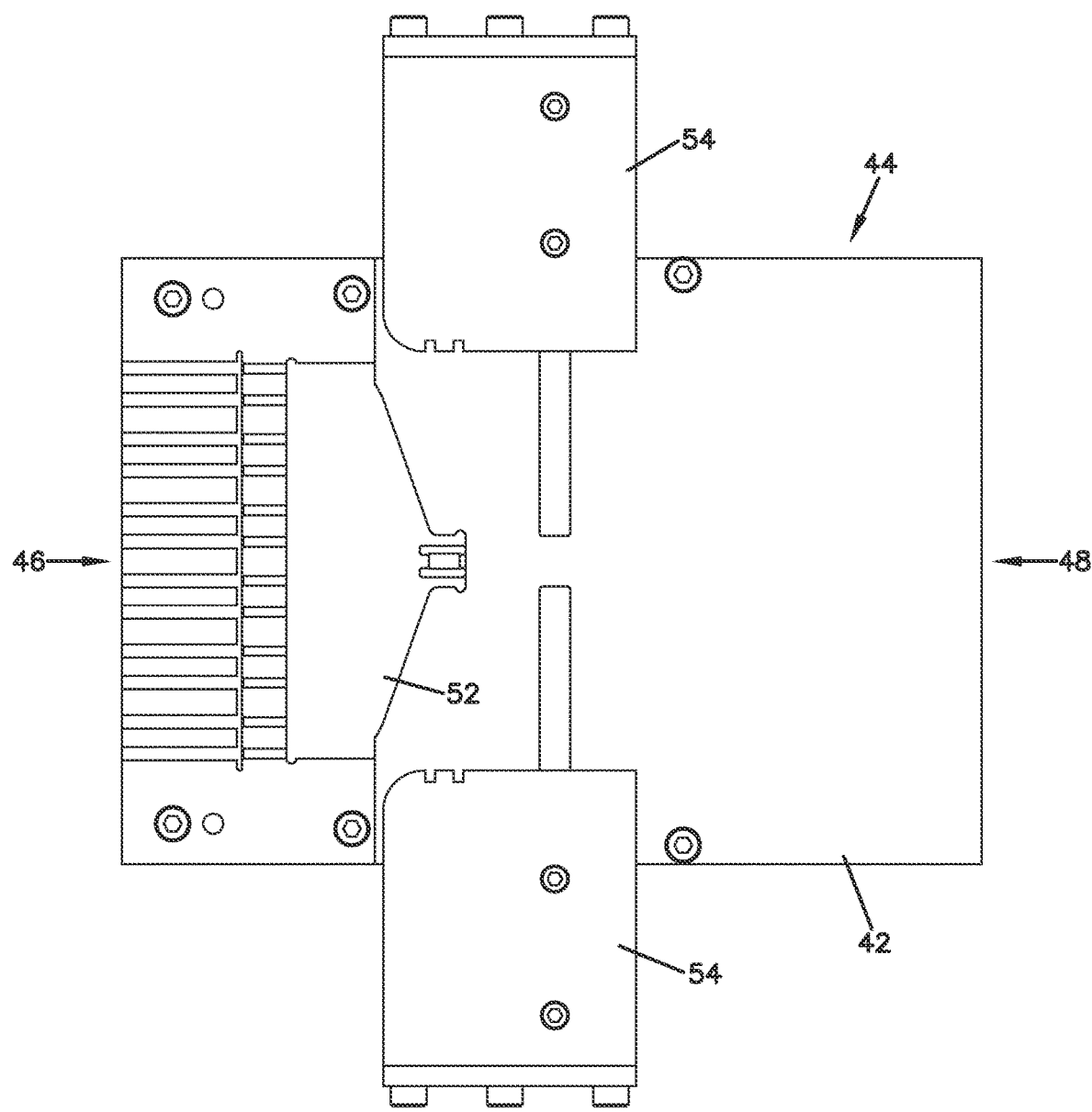
FIGS. 2-9A illustrate an example inventive method and tooling for forming the fiber optic array illustrated in FIG. 1.

The fiber clamp 30 is formed via a clip 32 that snap-fits into openings 34 defined at the rear end 24 of the substrate 16, as shown in FIG. 2. The fiber clamp 30 is configured to keep the consolidated fibers 12 in a given arrangement for further processing (e.g., ribbonizing). In certain embodiments, the clip 32 may include a foam adhesive pad 33 underside the clip 32 to help restrain the fibers 12 and to keep them in the consolidated arrangement (see FIG. 9A). In the array 10 and clamp 30 depicted in FIG. 1, the fibers 12 at the rear end 24 of the substrate 16 are horizontally layered for ribbonizing and termination to a multi-fiber ferrule of a multi-fiber connector such as an MPO style connector. As noted previously, such an MPO connector may form the signal input location of the fiber optic cassette that houses the fiber optic array 10 of the present disclosure.

Still referring to FIG. 1, the fiber optic array 10 includes a first piece of adhesive tape 36 used for securing the fibers 12 to the substrate 16 at the front end 22 of the substrate 16 and a second piece of adhesive tape 38 for securing the fibers 12 at the curved portions 40 of the channels 26 from which the fibers 12 extend toward the consolidation point 28.

Now referring to FIGS. 2-9, examples of tooling and methods for manufacturing the fiber optic array 10 illustrated in FIG. 1 are herein described.

In FIG. 2, a base 42 of a fixture 44 used in forming the fiber optic array 10 is shown. The base 42 defines a front end 46, a rear end 48, and a bearing surface 50 extending therebetween against which the fibers 12 can be laid. Adjacent the front end 46 of the base 42 is an insert cavity 52. The insert cavity 52 is configured to receive the substrate 16 that eventually forms a part of the fiber optic array 10 as discussed above. The substrate 16, thus, in such an embodiment is provided as a removable insert of the fixture 44.

In other embodiments, as will be discussed in further detail below, the fiber array that is formed may lack a rigid substrate to support the fibers 12, and the channels that receive the fibers 12 may be an integral part of the fixture rather than being provided on a removable structure. Please see the fiber array 210 of FIGS. 24-32.

Referring back to FIG. 2, the fixture 44 includes a pair of contact blades 54 slidably attached to the base 42. The blades 54 are configured to move along a direction transverse to the longitudinal axes of the fibers 12 that are positioned within the channels 26 and consolidate the fibers 12 to form the array 10 as shown in FIG. 1.

Figure 3:
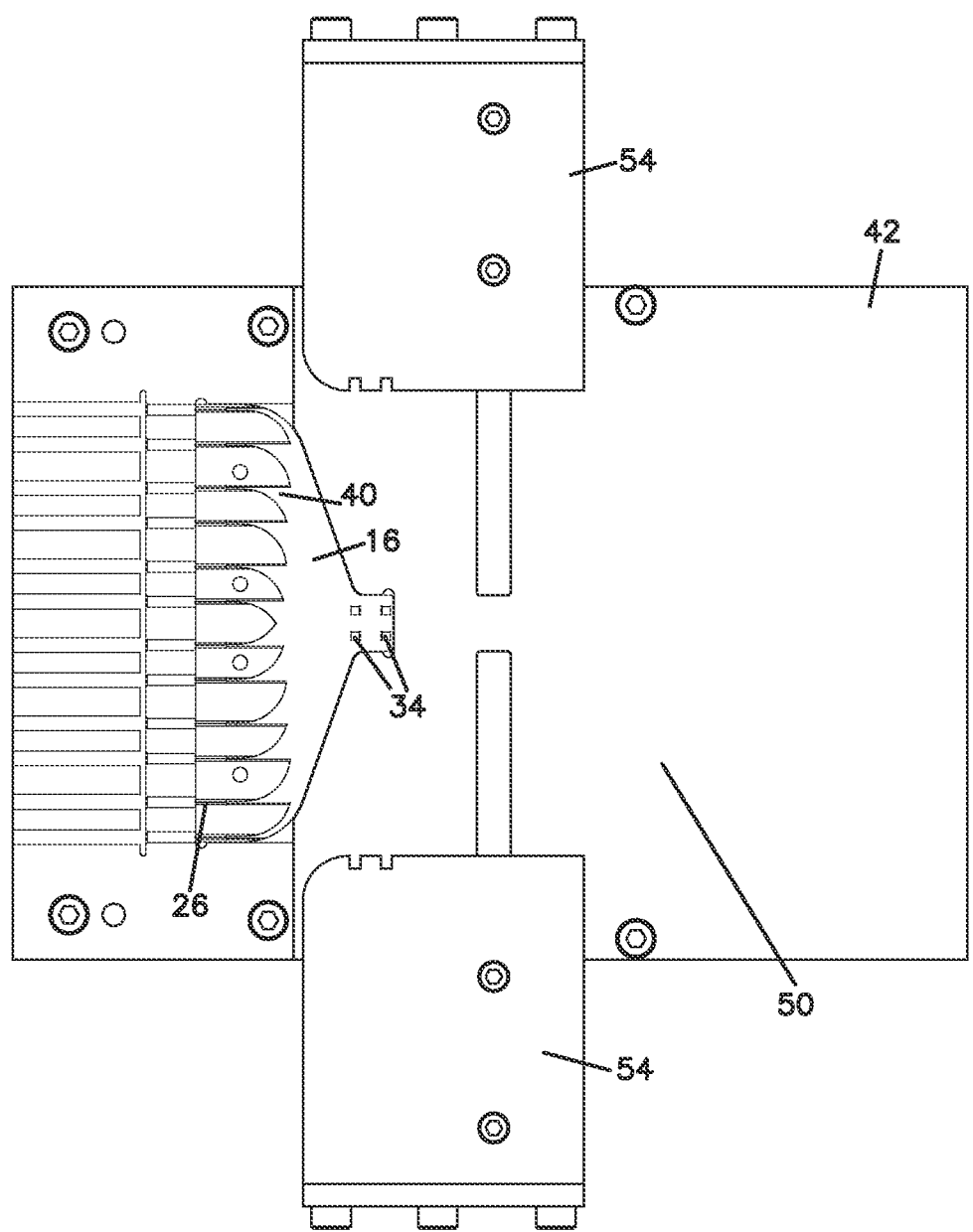
Figure 4:
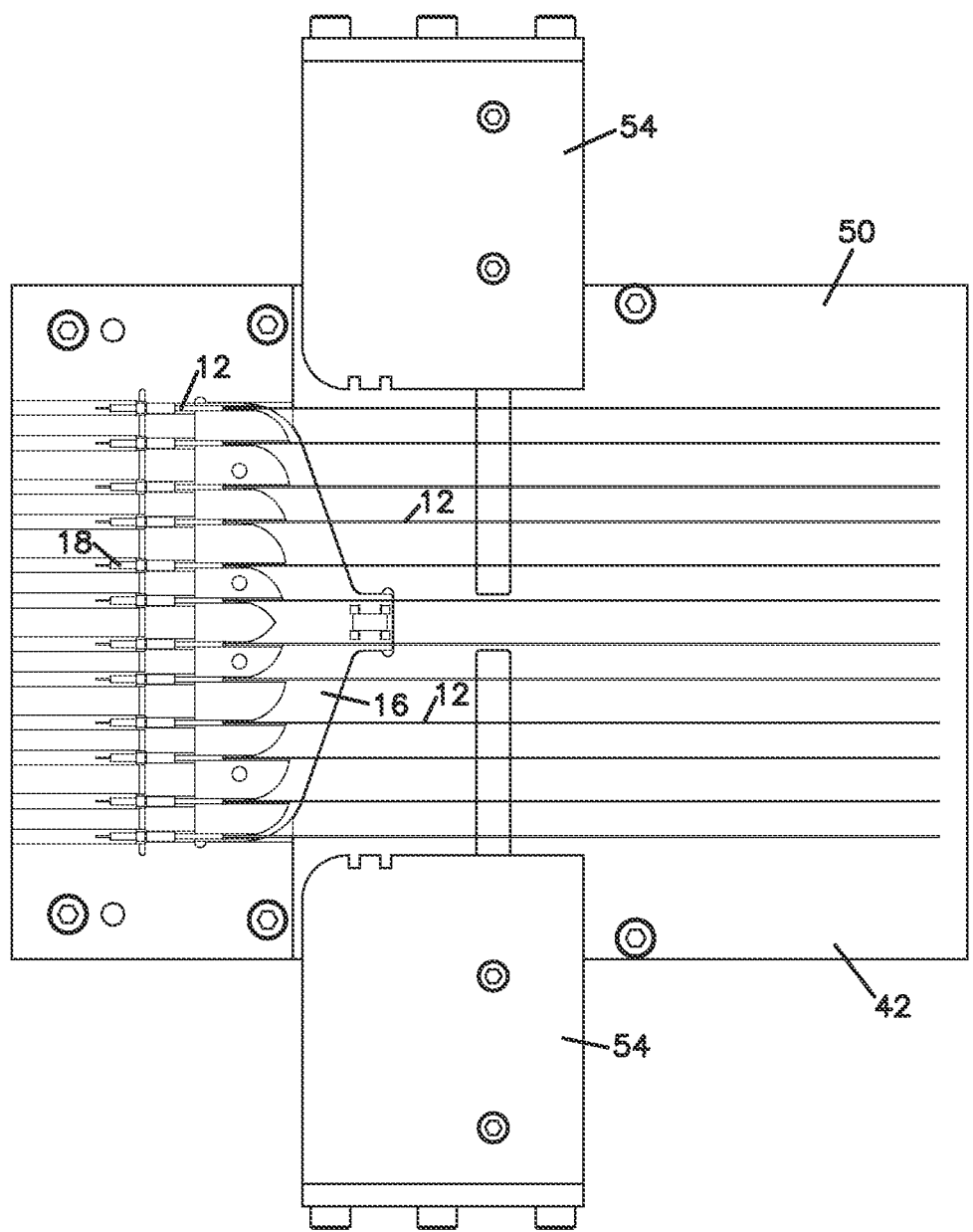
Figure 5:
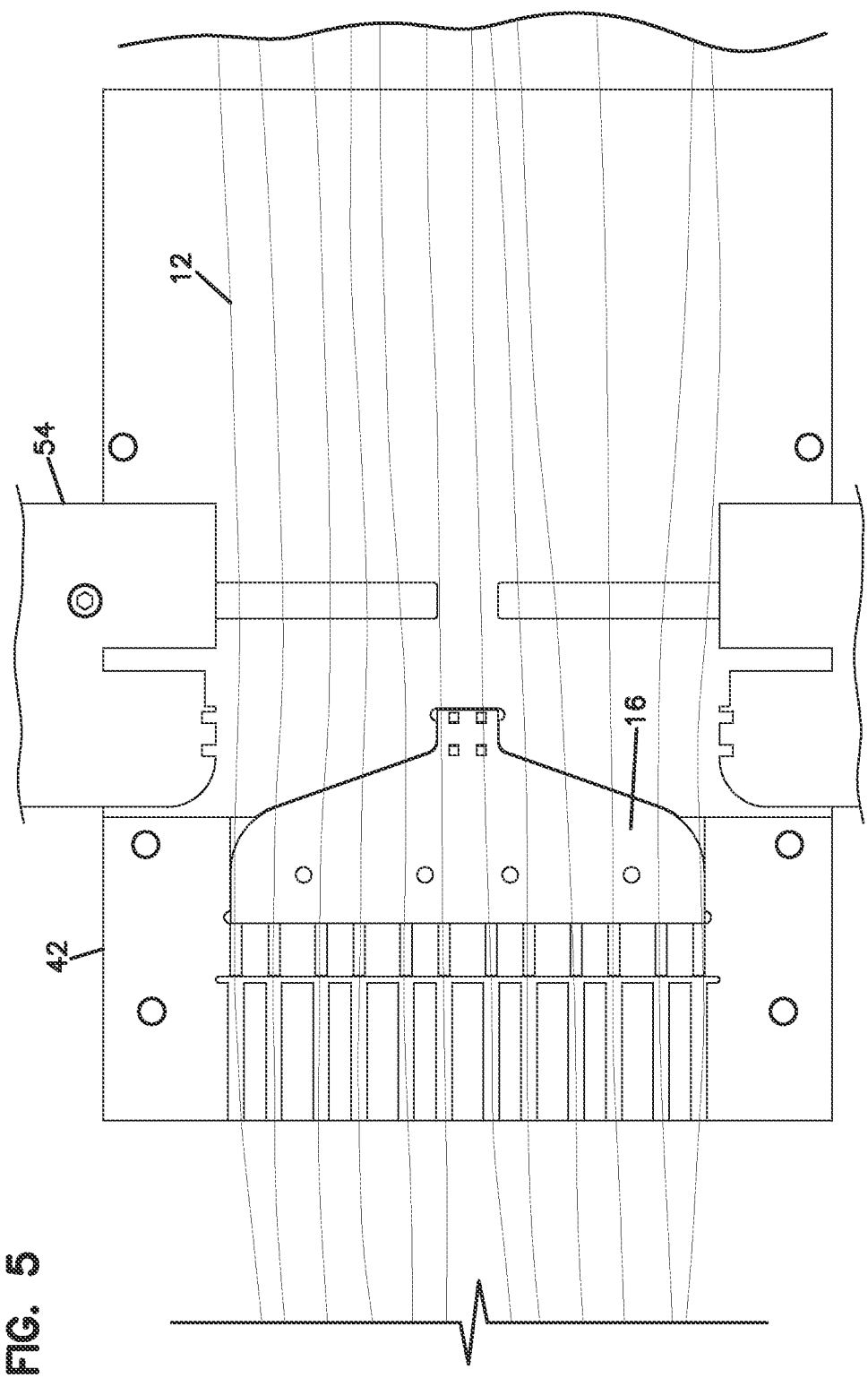

FIG. 3 shows the substrate insert 16 having been placed in the insert cavity 52, ready to receive the pigtails 12. FIGS. 4-5 show the fiber pigtails 12 loaded on the substrate insert 16.

Figure 6:
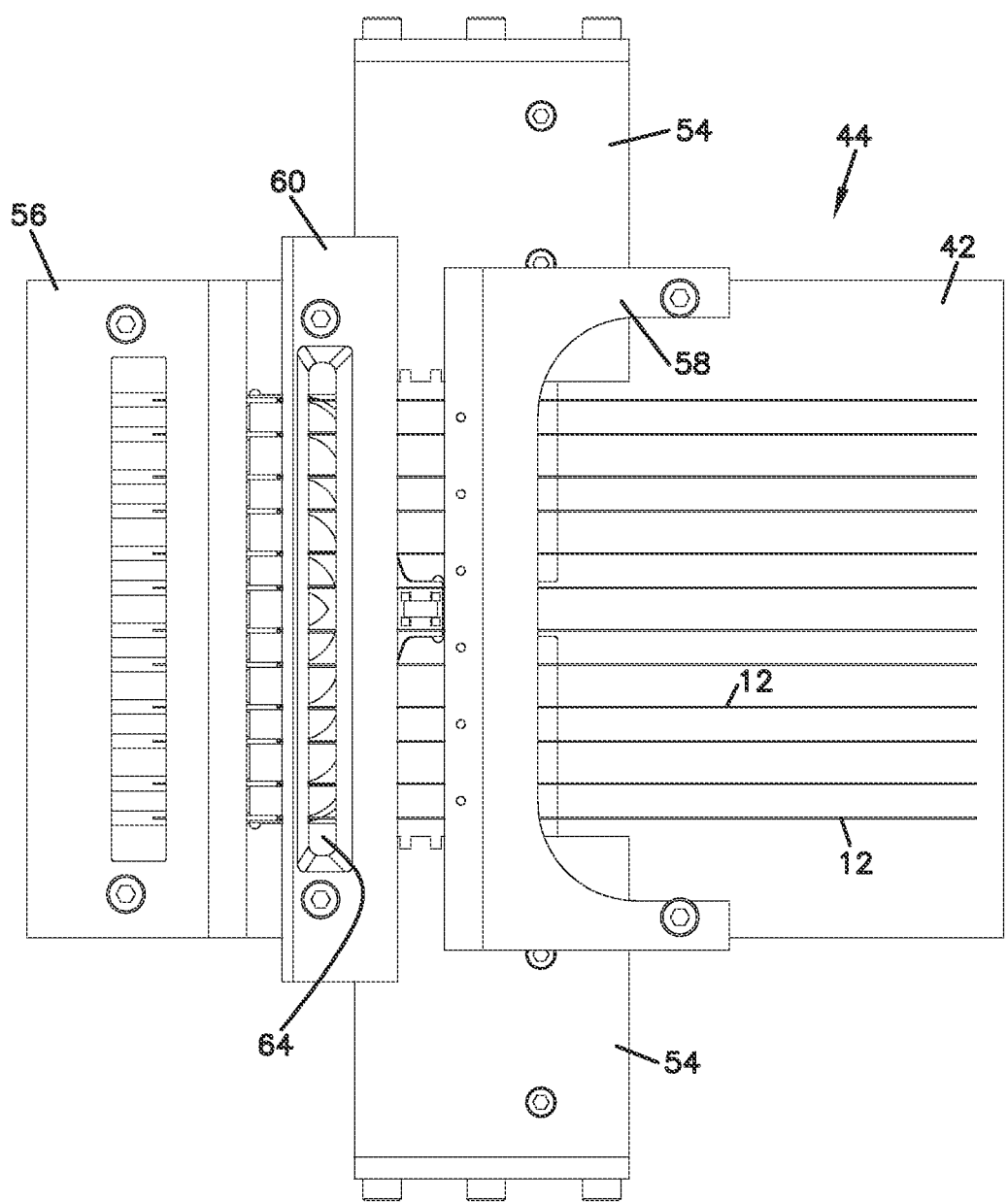

As shown in FIG. 6, the fixture 44 includes clamping structures for keeping the fibers 12 within the channels 26 before consolidation by the contact blades 54. In FIG. 6, the fixture 44 is shown with a first clamp 56 that is mounted adjacent the front end 46 of the base 42 for keeping the fibers 12 within the channels 26. A second clamp 58 is provided adjacent the rear end 48 of the base 42 for keeping the fibers 12 against the bearing surface 50. A guide clamp 60 is positioned between the first and second clamps 56, 58. The guide clamp 60 keeps the fibers 12 within the channels 26 of the substrate/insert 16 as the fibers 12 transition from the parallel portions of the channels 26 to curved rear portions 40. As noted above, the curvature of the channels 26 are designed to protect the minimum bend radius requirements of the fibers 12 as the fibers 12 transition from a spaced-apart arrangement to the consolidation point 28 defined on the substrate 16, wherein the fibers 12 become layered next to each other, ready for a further ribbonizing process.

The guide clamp 60 is also positioned such that a first space 62 is provided between the first clamp 56 and the guide clamp 60. The first space 62 indicates the location for securing the first piece of adhesive tape 36 to the fibers 12. As noted above, the first piece of tape 36 is used for securing the fibers 12 to the substrate 16 at the front end 22 of the substrate 16. As shown in FIG. 6, an opening 64 is also provided on the guide clamp 60. The opening 64 defines a second space 66 that indicates the location for securing the second piece of adhesive tape 38 to the fibers 12. The second piece of tape 38 is used for securing the fibers 12 at the curved portions 40 of the channels 26.

Figure 7:
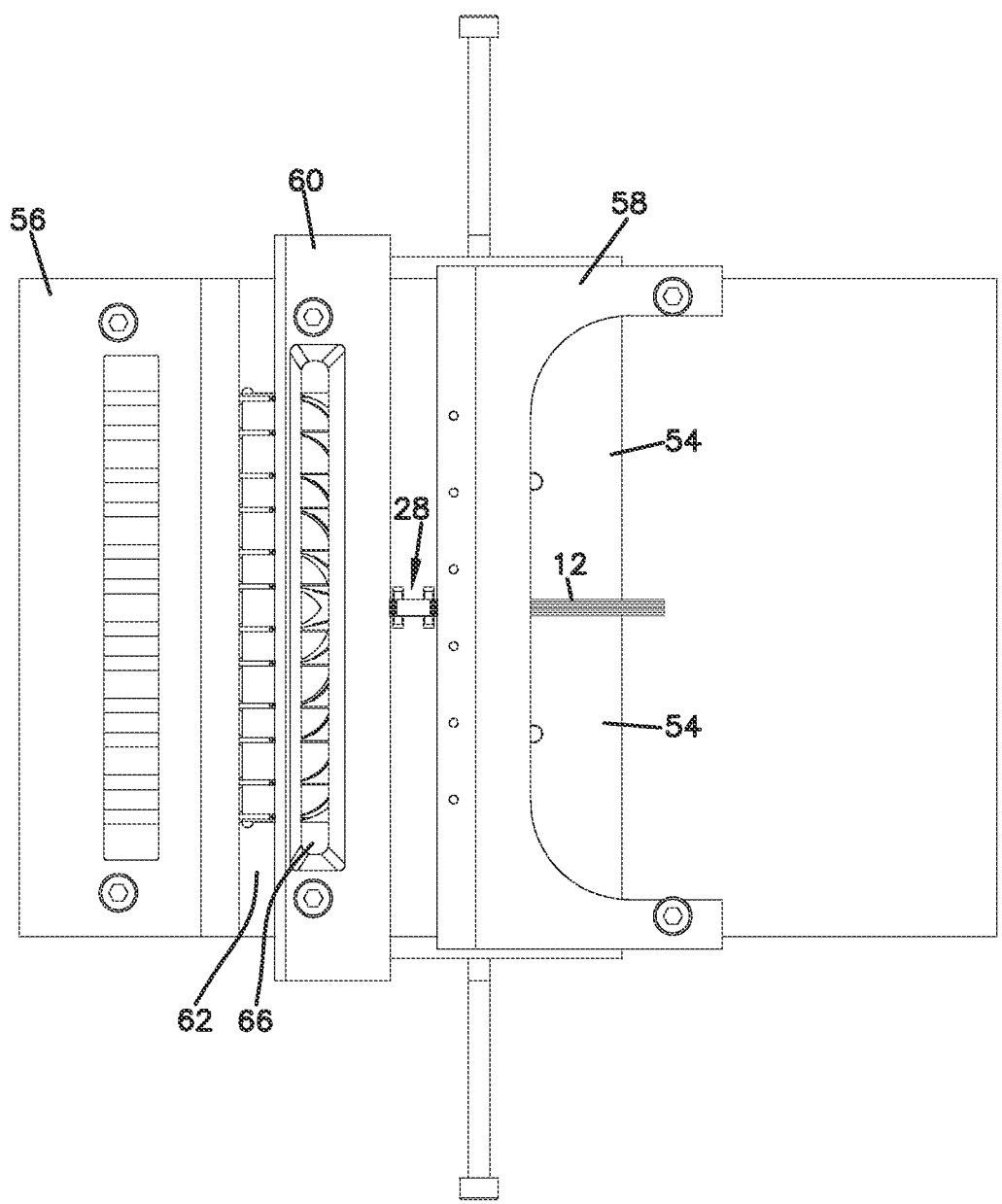

Referring now to FIG. 7, once the clamps 56, 58, 60 are all in place, the contact blades 54 are slidably moved along a direction transverse to the longitudinal axes of the fibers 12 that are positioned within the channels 26 and the fibers 12 are consolidated. Thus, using the contact blades 54, the fibers 12 are moved from a spaced-apart arrangement to a consolidated arrangement wherein the fibers 12 end up layered next to each other, ready for a ribbonizing process.

Figure 8:
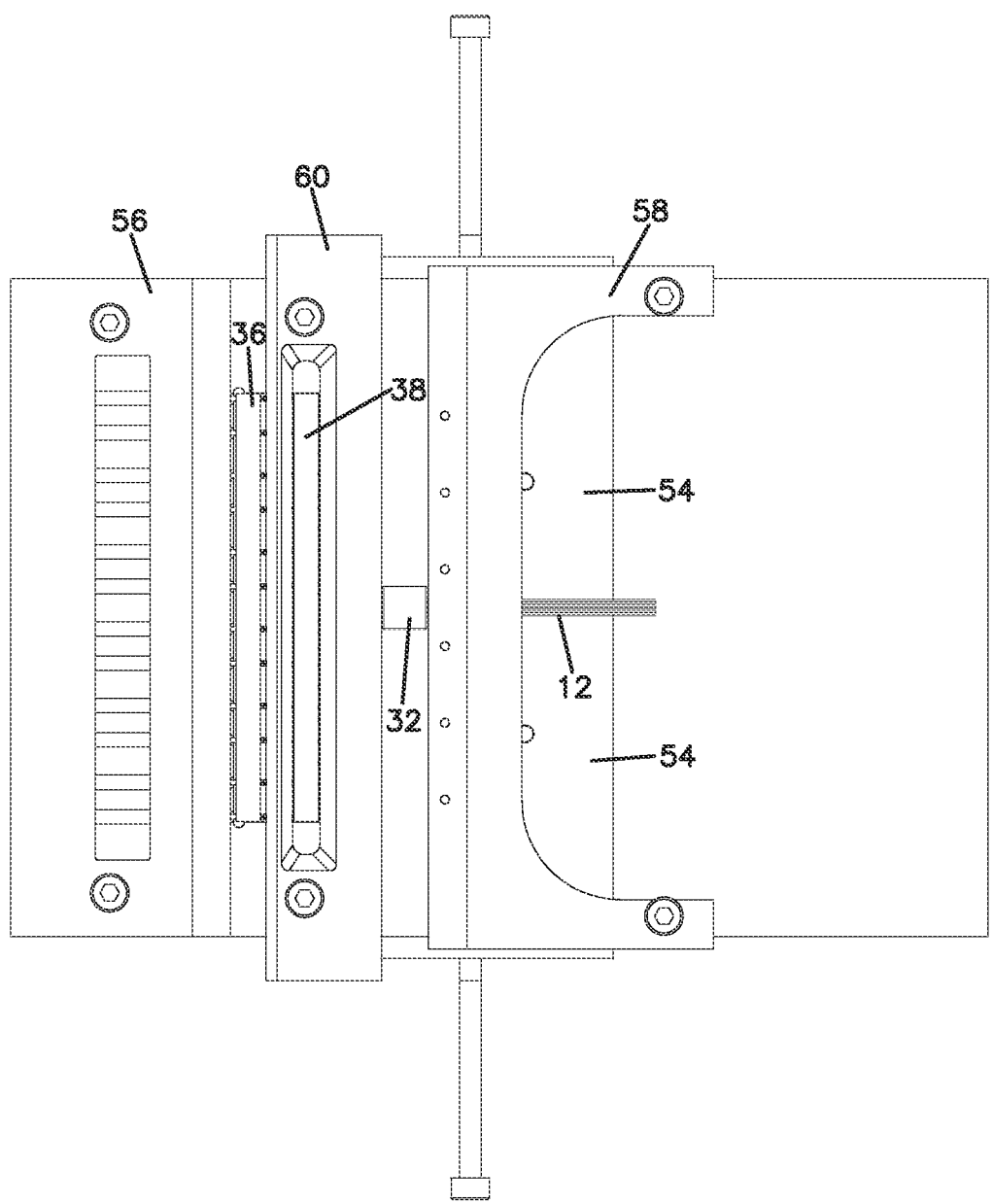

Referring to FIG. 8, once the fibers 12 have been consolidated, the fiber clamp 30 is applied at the consolidation point 28 defined by the substrate 16. In addition, the first and the second pieces of adhesive tape 36, 38 are applied at the first and second spaces 62, 66, respectively, to secure the fibers 12 to the substrate 16.

Figure 9:
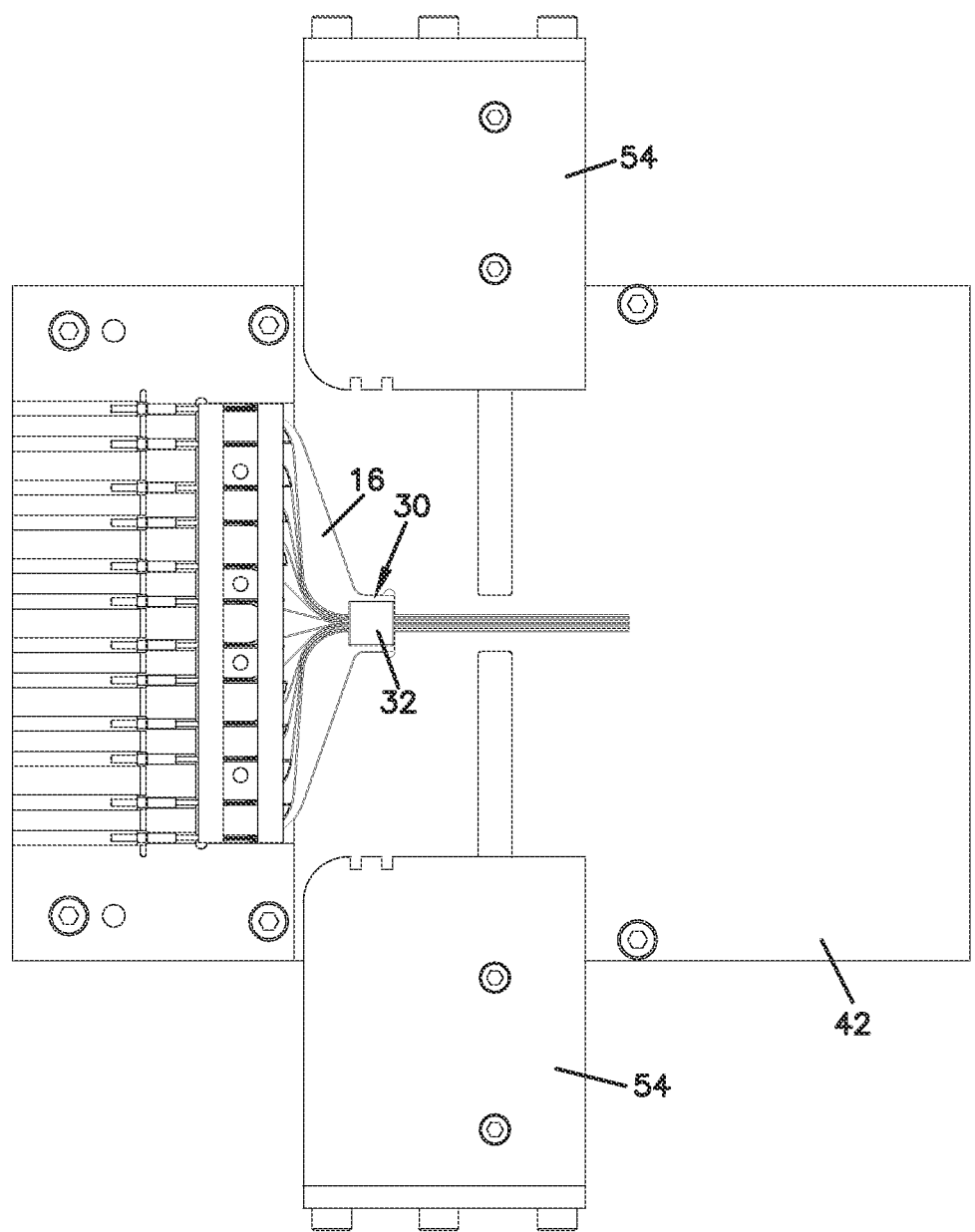
Figure 9A:
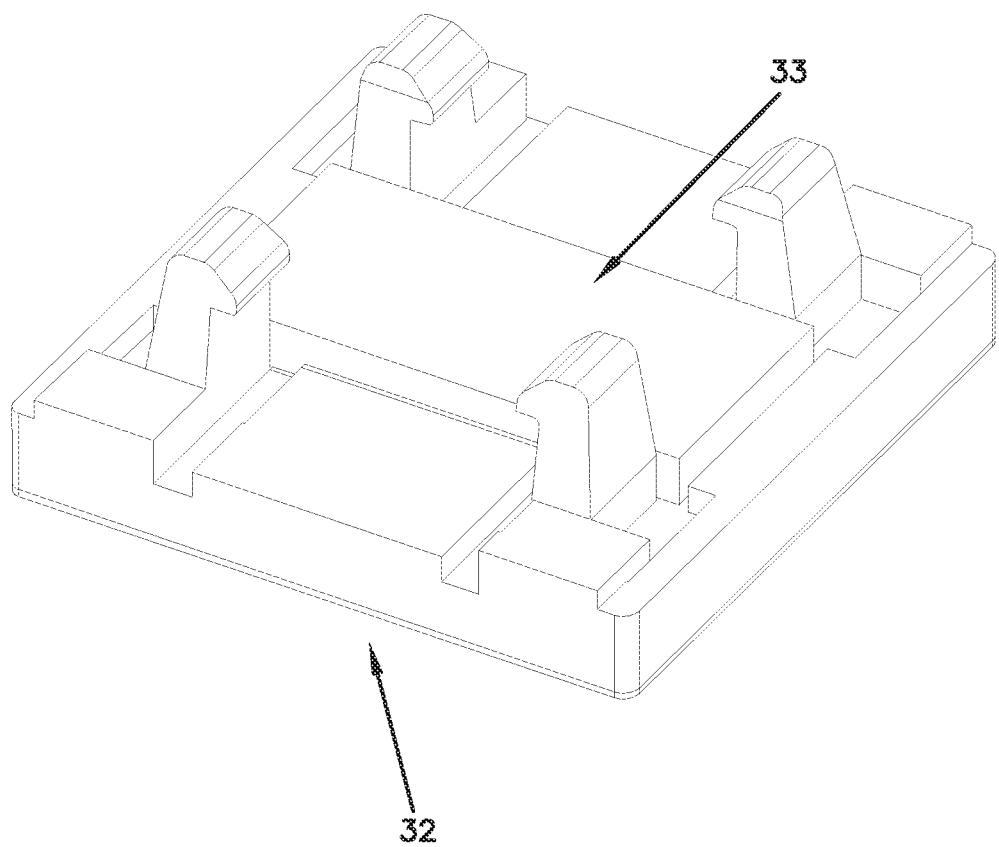

Referring to FIG. 9, the clamps 56, 58, 60 are removed from the base 42 and the contact blades 54 are slidably moved away from each other.

When the substrate 16 is removed from the fixture 44, the fiber optic array 10 that is shown in FIG. 1 has been formed.

Figure 22:
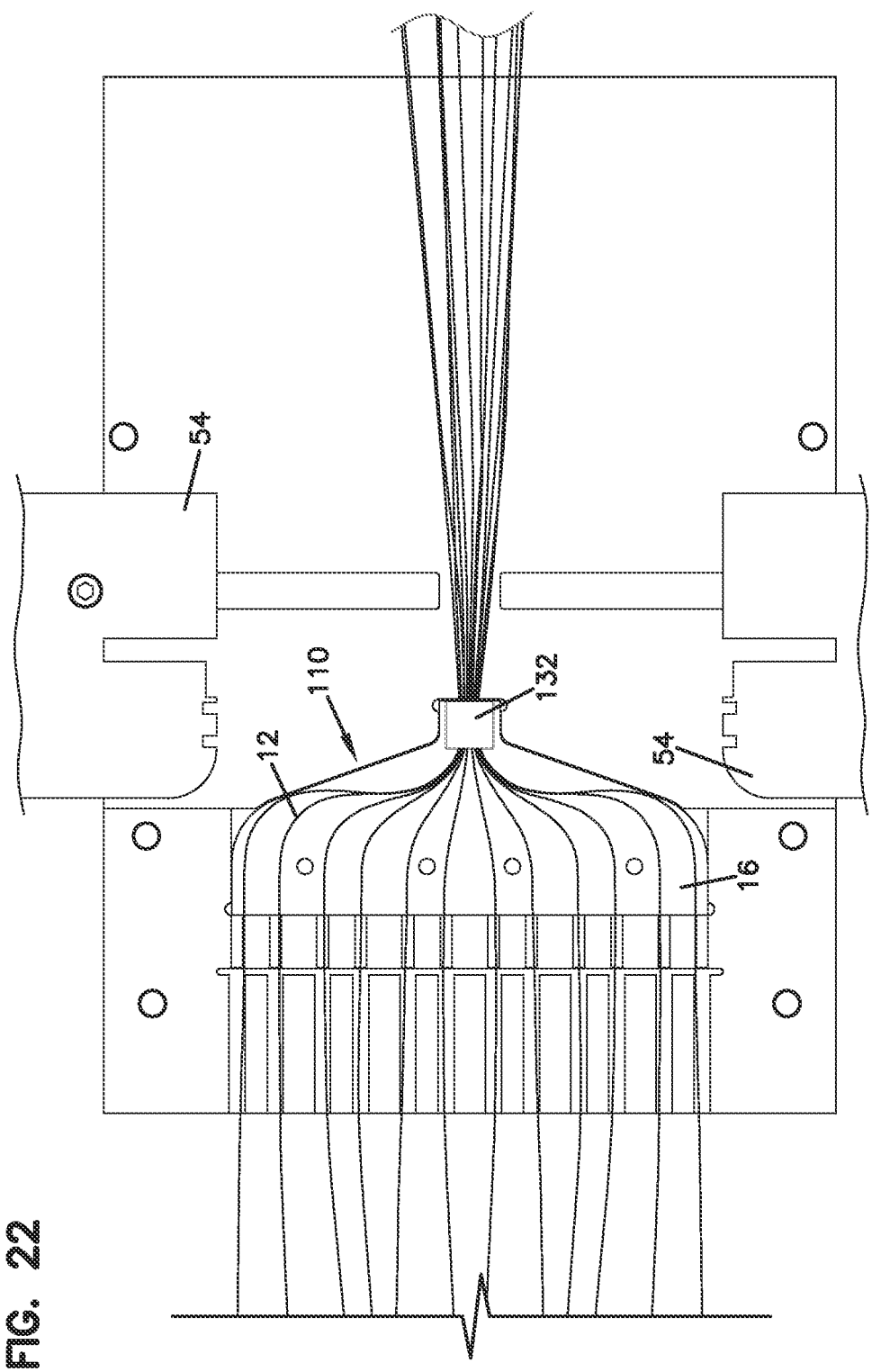
Figure 23:
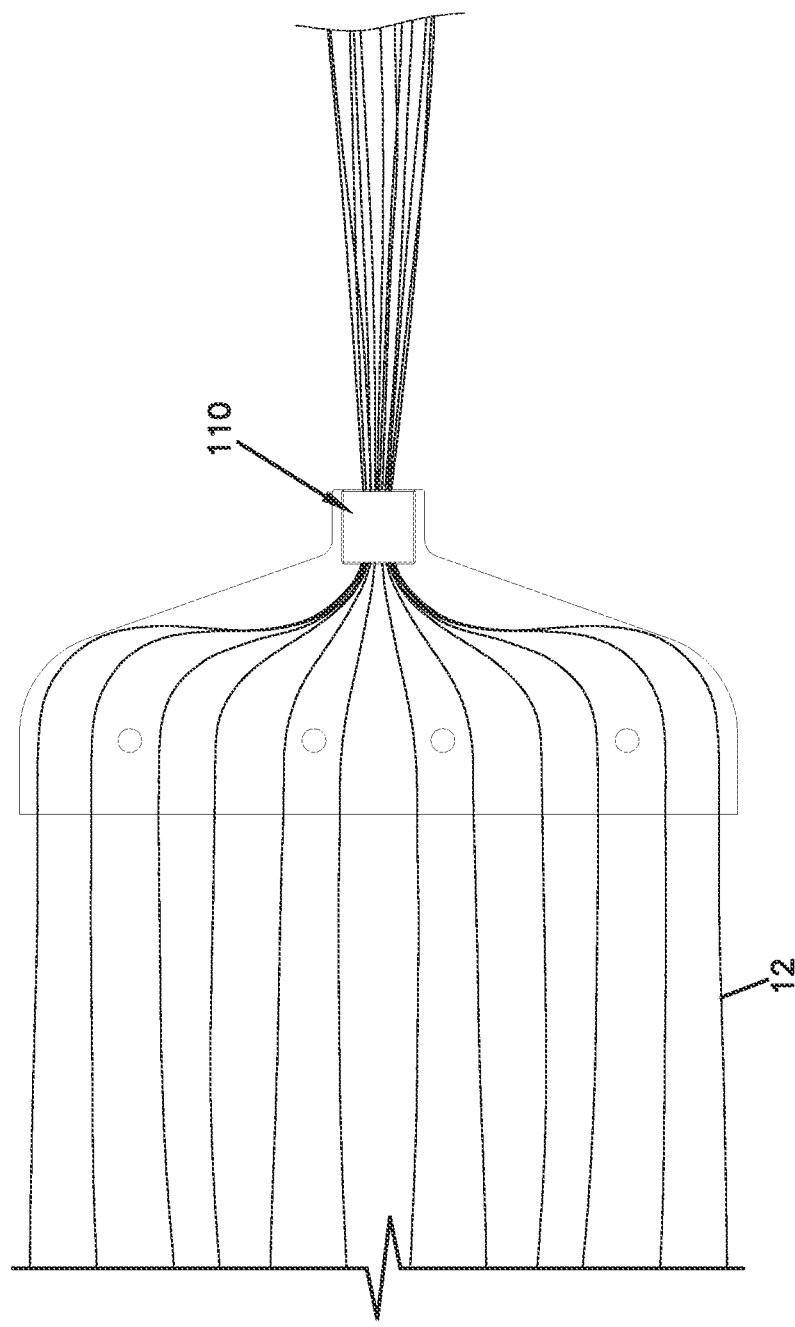
FIG. 23 illustrates the inventive fiber optic array formed according to the method and tooling illustrated in FIGS. 10-22.

Now referring to FIGS. 10-22, an example inventive method and tooling for forming a fiber optic array 110 that is similar to that shown in FIG. 1 is illustrated. However, as will be described in further detail, the fiber optic array 110 formed according to the method and tooling of FIGS. 10-22 includes crossed-over fiber pairs 112. FIG. 23 illustrates the inventive fiber optic array 110 formed according to the method and tooling illustrated in FIGS. 10-22.

It should be noted that the same fixture 44 that is used to form the array 10 of FIGS. 1-9 can be used to form the array 110 of FIGS. 10-22.

Figure 10:
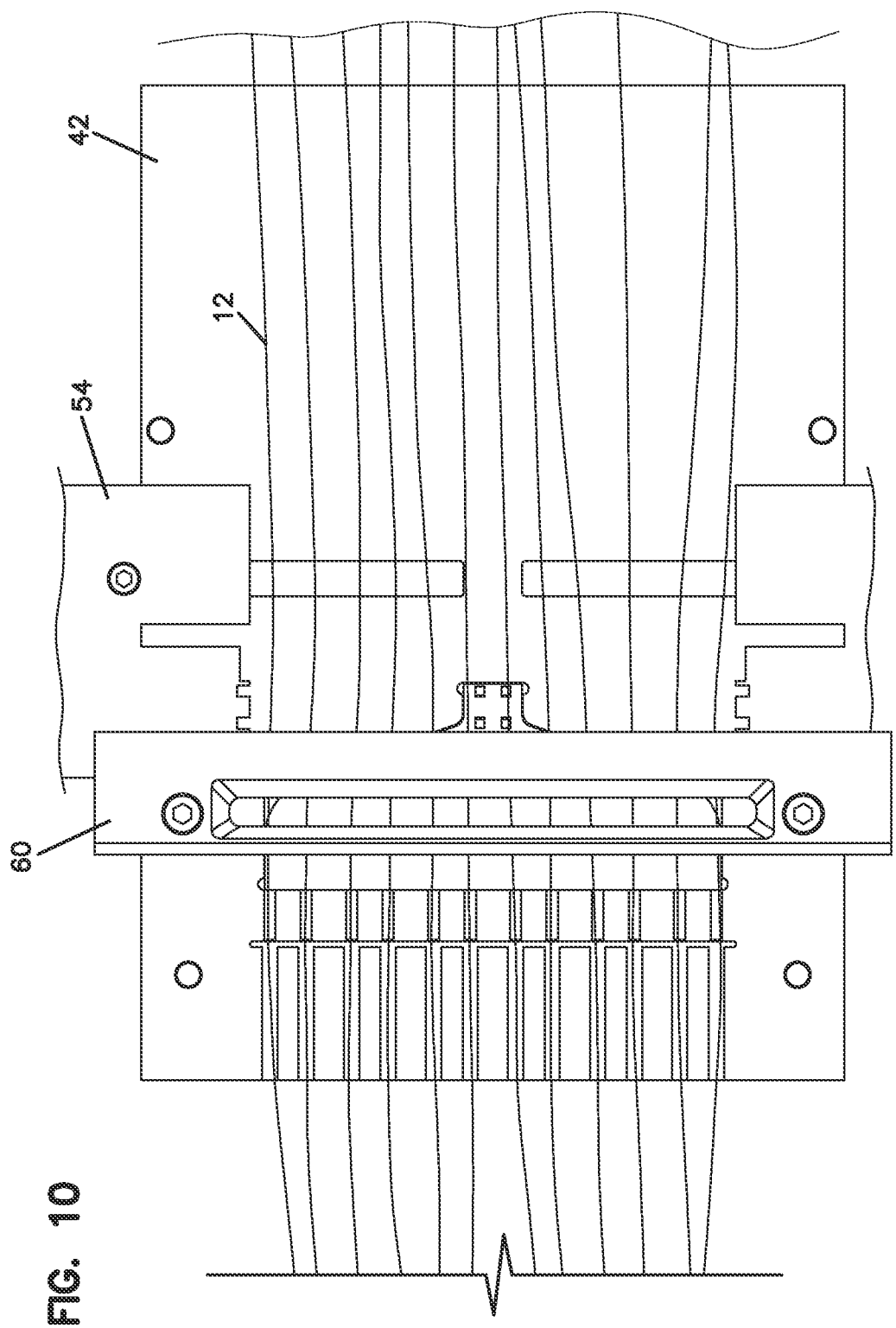
FIGS. 10-22 illustrate an example inventive method and tooling for forming a fiber optic array similar to that shown in FIG. 1, except that the array formed by the method illustrated in FIGS. 10-22 includes crossed-over fiber pairs.
Figure 11:
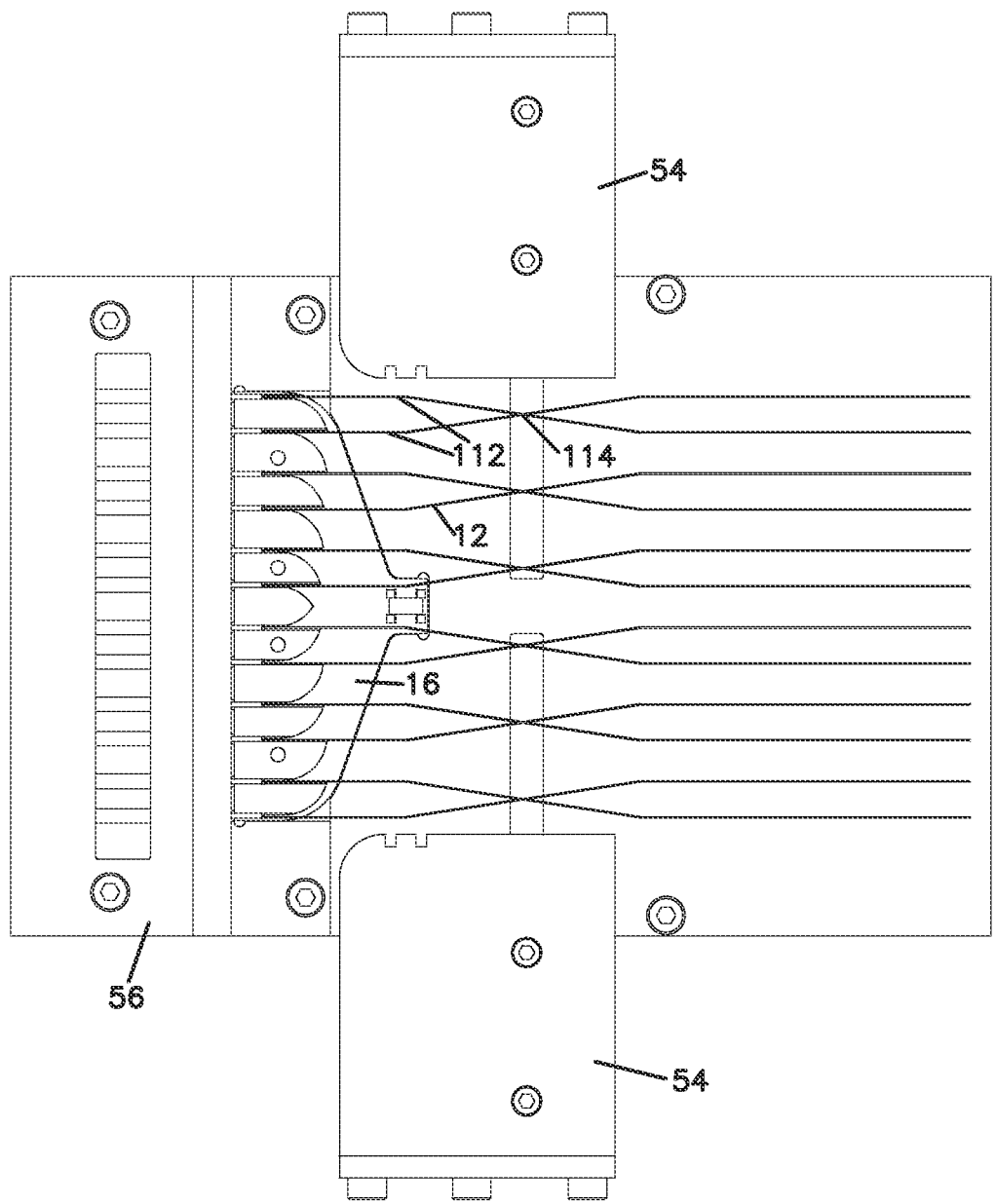
Figure 12:
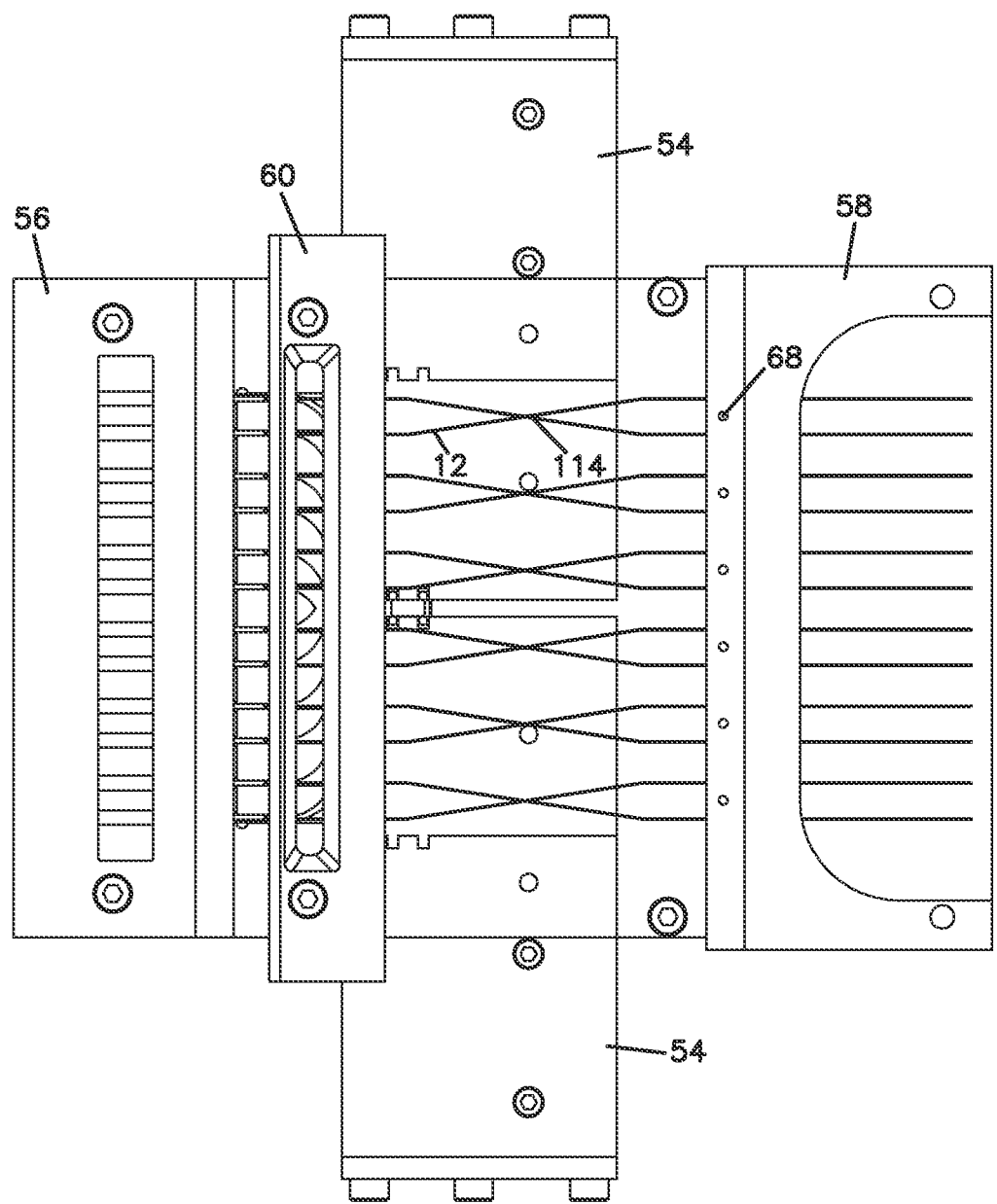
Figure 13:
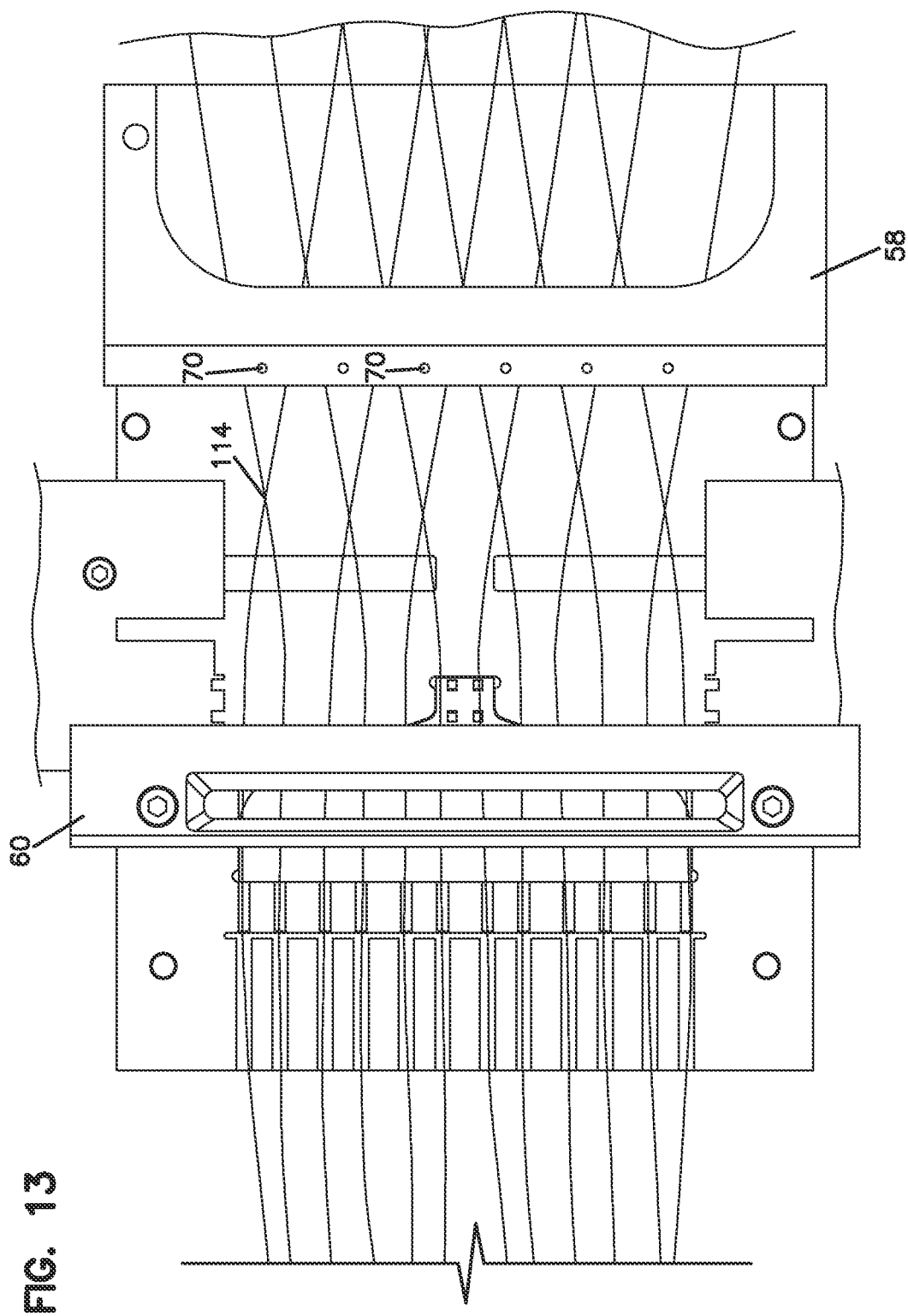
Figure 14:
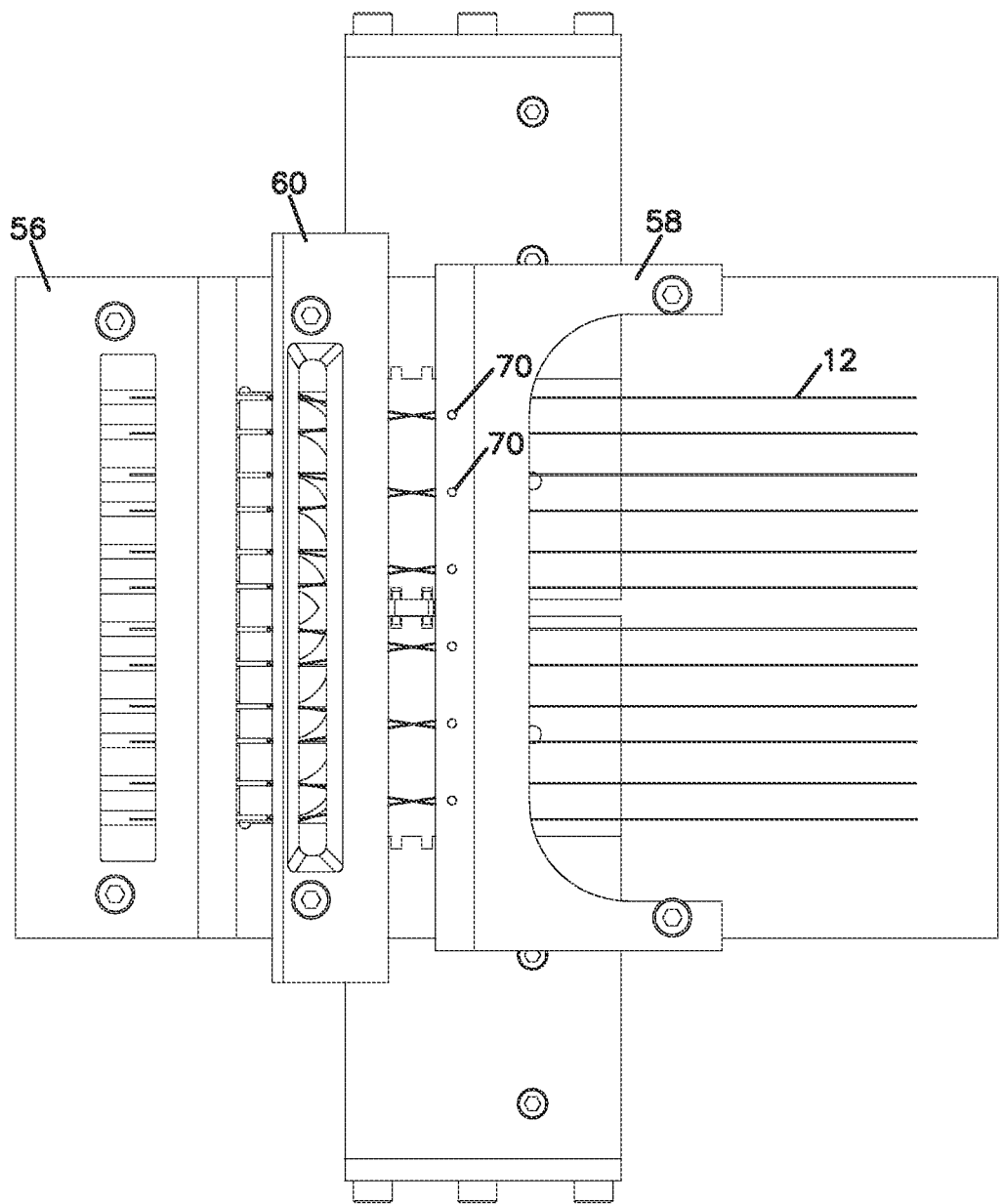
Figure 15:
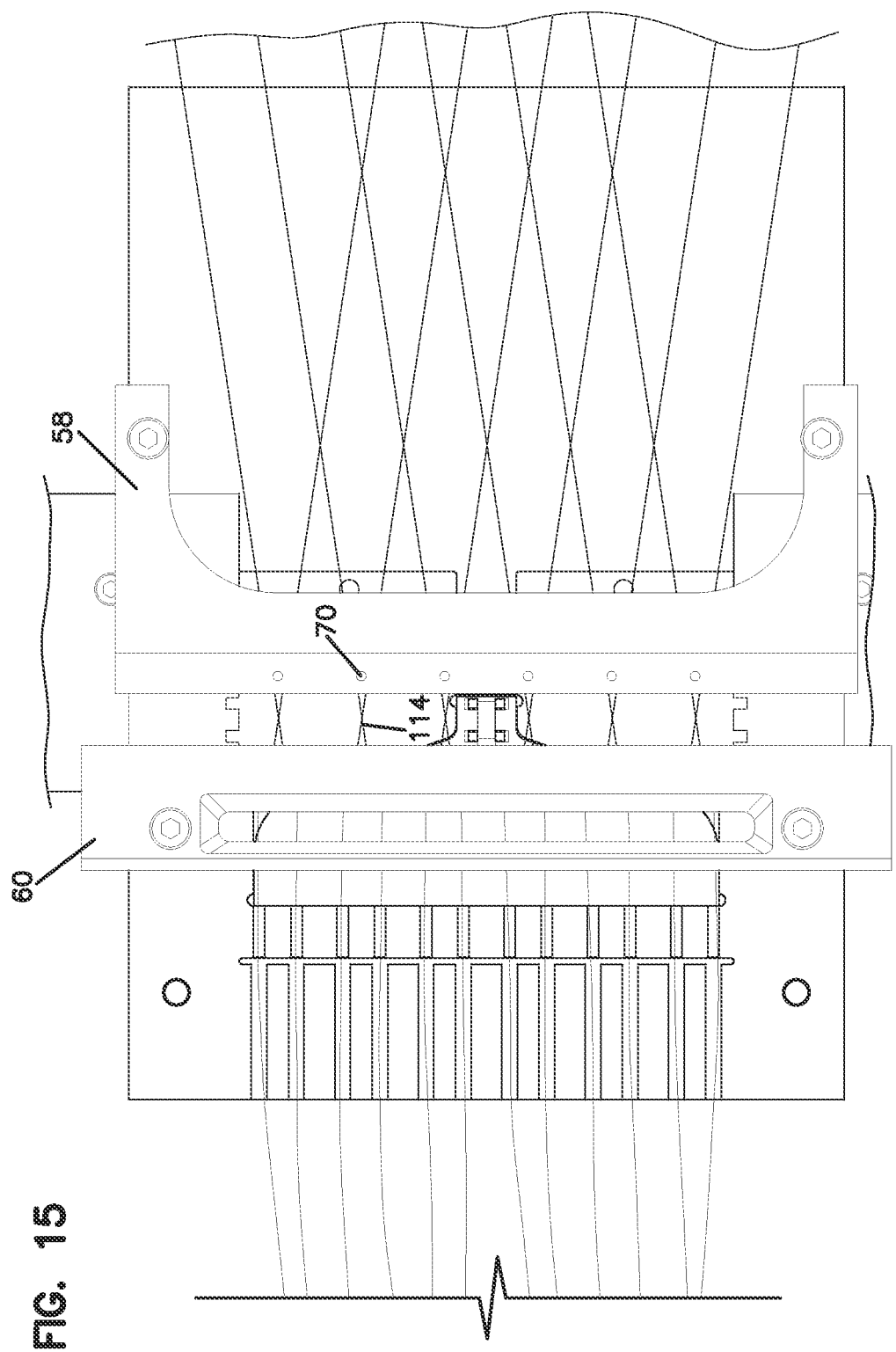

Now referring specifically to FIGS. 10-11, after the substrate insert 16 has been placed within the insert cavity 52 and the fiber pigtails 12 have been placed within the channels 26, the first clamp 56 and the guide clamp 60 are mounted to the base 42 to keep the fibers 12 within the channels 26.

As shown, when the fibers 12 are positioned within the channels 26, the fibers 12 define fiber pairs 112. In the depicted example, there are six fiber pairs 112 since there are twelve total fibers 12 within the channels 26. As shown specifically in FIG. 11, for forming crossed-over fibers, the fibers 12 defining each given pair 112 are crossed-over. A cross-over point 114 is defined for each pair 112.

Now referring to FIGS. 12-15, the second clamp 58 that is used to keep the fibers 12 against the bearing surface 50 of the base 42 is used to move the cross-over point 114 toward the front end 46 of the base 42. For performing this step, the second clamp 58 defines pockets 68 for receiving a plurality of vertical pins 70. Each pin 70 is located on the second clamp 58 such that it is positioned between a given pair 112 of fibers 12 and is configured to contact both of the fibers 12 at their cross-over point 114 and move the cross-over point 114 toward the front end 46 of the base 42, toward the channels 26.

As shown in FIGS. 12-15, the second clamp 58 is slidably moved toward the guide clamp 60, moving each cross-over point 114 therewith.

Figure 16:
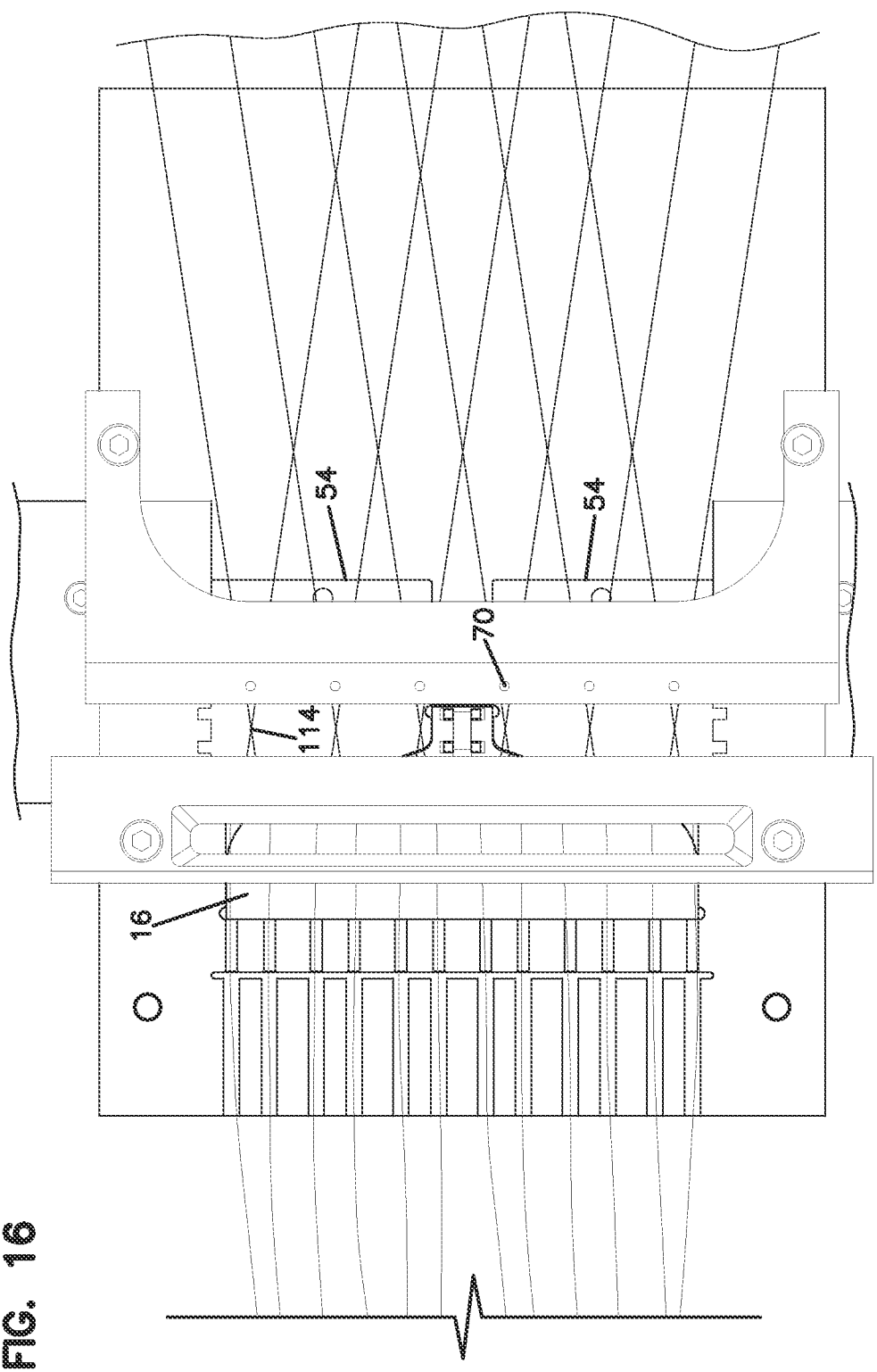

As shown in FIG. 16, once the second clamp 58 has been moved to its final position, the vertical pins 70 are removed from the second clamp 58.

Figure 17:
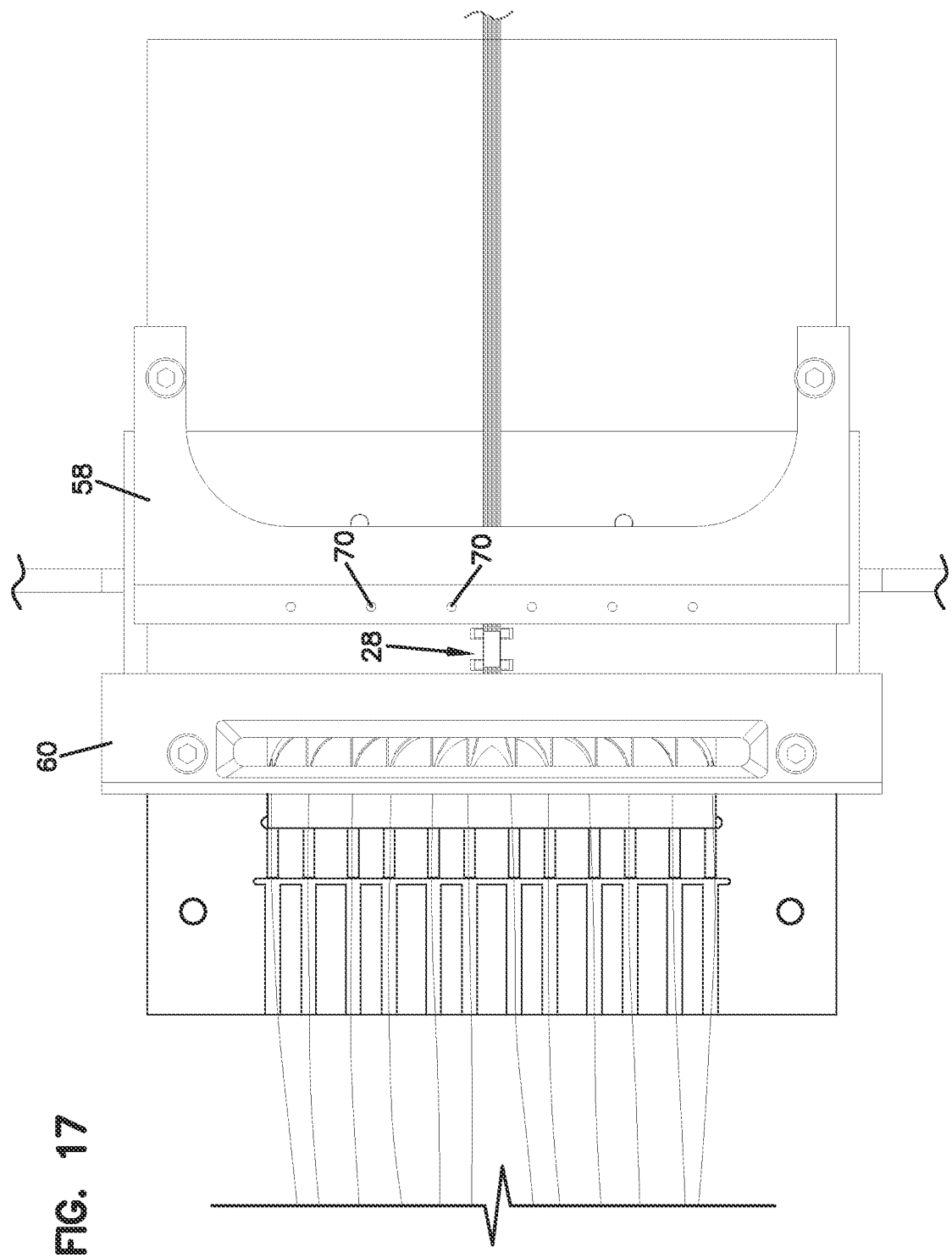
Figure 18:
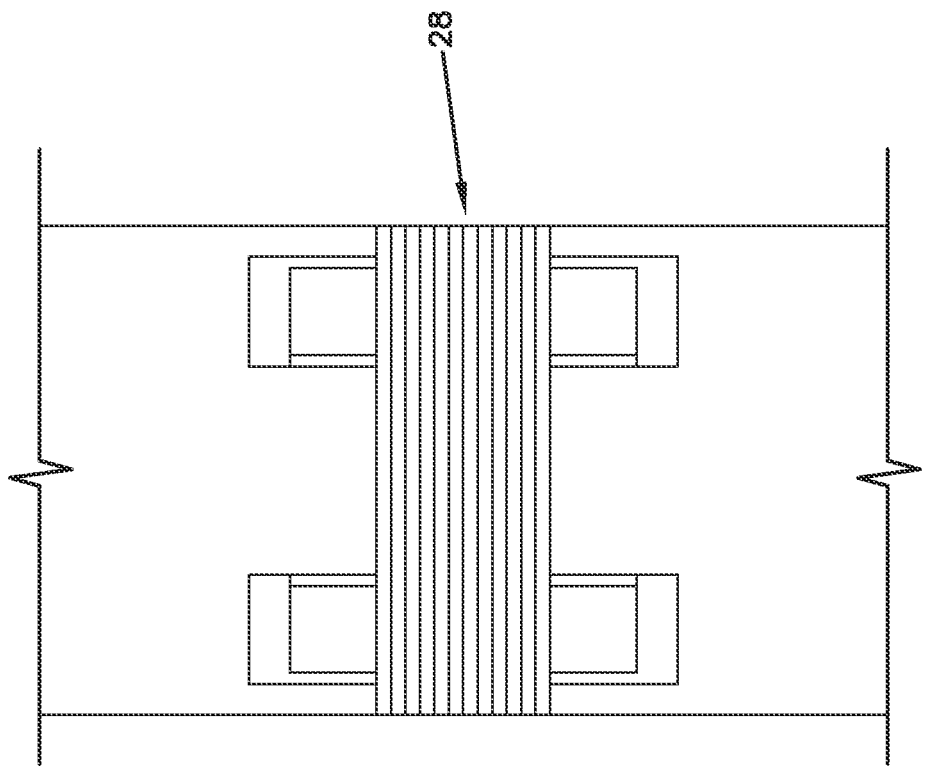
Figure 19:
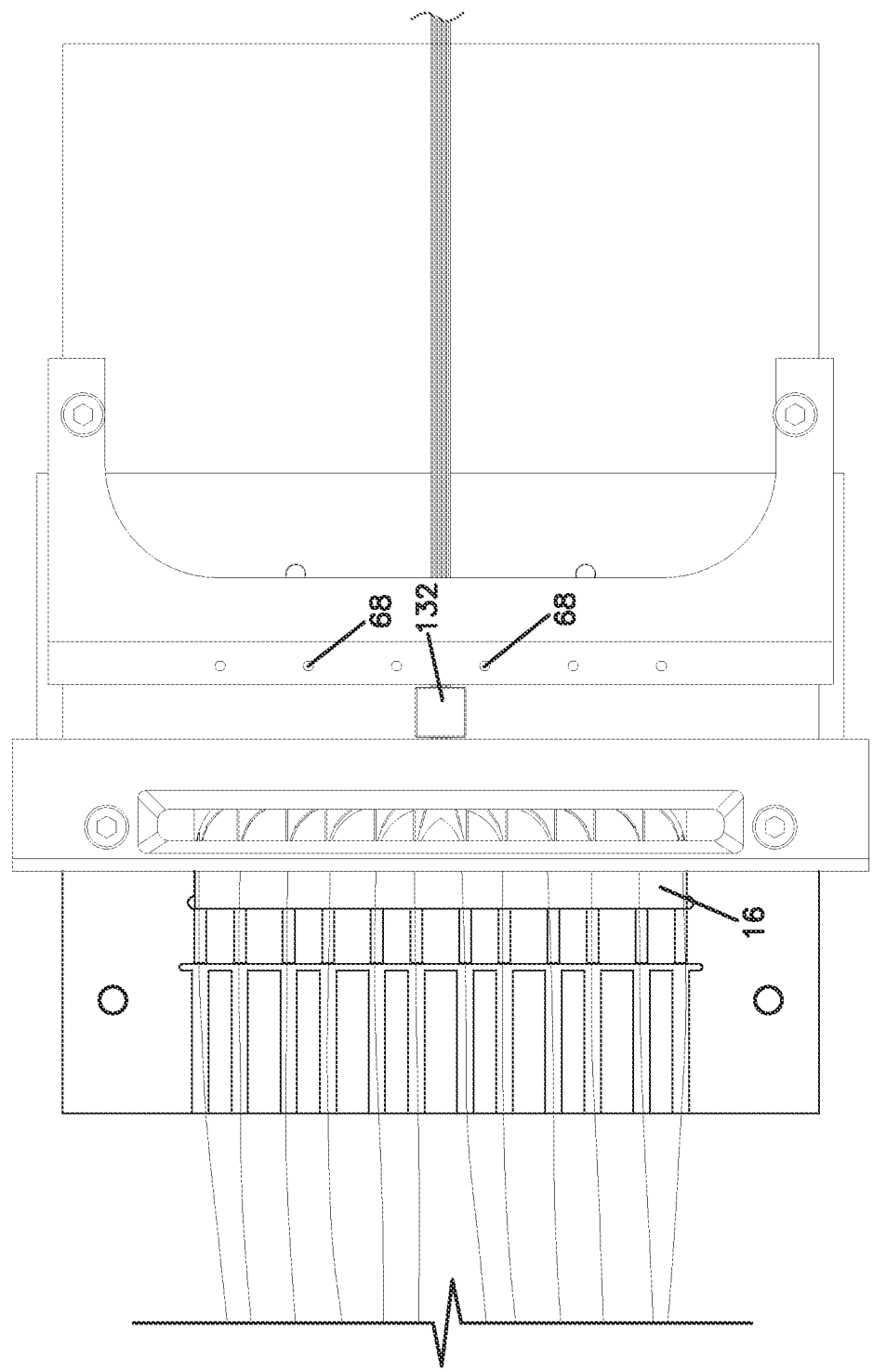

As shown in FIG. 17, similar to the method illustrated in FIGS. 1-9, next, the contact blades 54 are slidably moved along a direction transverse to the longitudinal axes of the fibers 12 that are positioned within the channels 26 to consolidate the fibers 12. Thus, similar to the method discussed previously, the fibers 12 are moved from a spaced-apart arrangement to a consolidated arrangement wherein the fibers 12 end up layered next to each other, ready for a ribbonizing process. The consolidation point 28 is illustrated in FIG. 18. When the fibers 12 have been consolidated, the fiber clamp 30 is applied at the consolidation point 28 as shown in FIG. 19.

Figure 20:
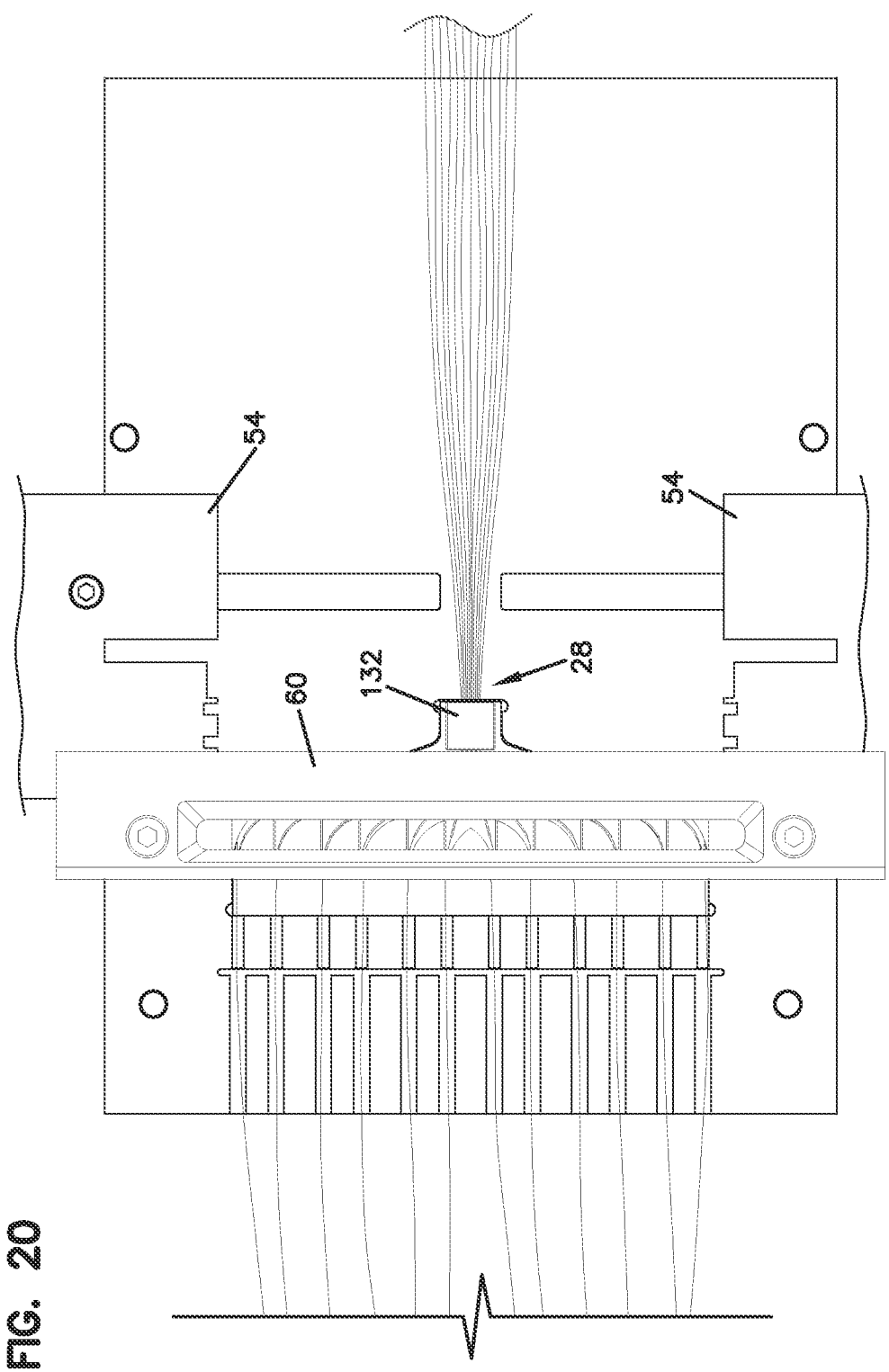
Figure 21:
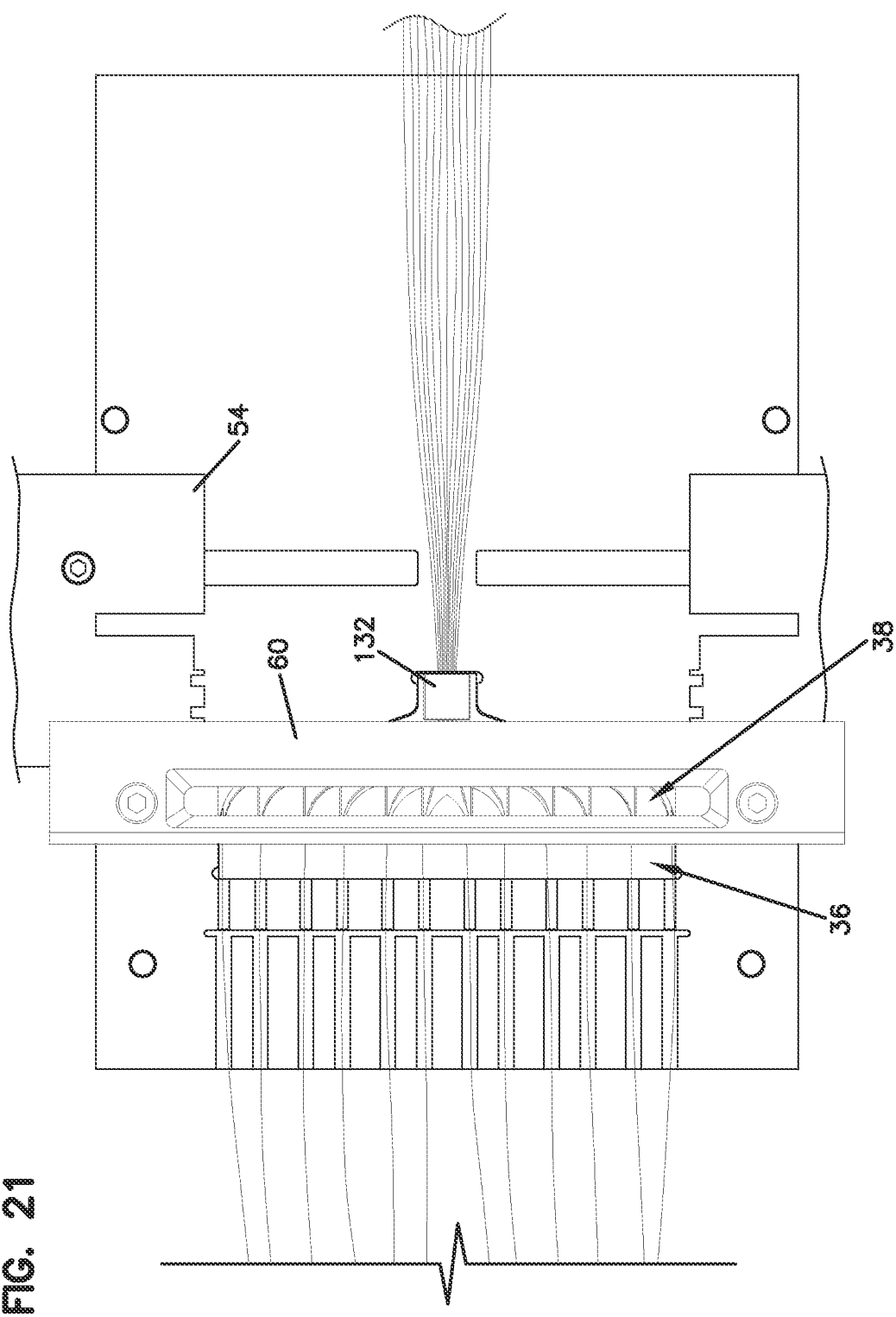

Referring to FIGS. 20 and 21, once the fibers 12 have been consolidated and clamped to the substrate 16, the contact blades 54 are slidably moved away from each other and the first and the second pieces of adhesive tape 36, 38 are applied at the first and second spaces 62, 66, respectively, to further secure the fibers 12 to the substrate 16. FIG. 22 illustrates removal of the guide clamp 60 after the pieces of adhesive tape 36, 38 have been applied.

As discussed previously, FIG. 23 illustrates the inventive fiber optic array 110 formed according to the method and tooling illustrated in FIGS. 10-22. It should be noted that a different clip 132 may be used for clamping crossed-over fiber pairs 112 versus horizontally flat fibers 12. For example, the clip 132 may define a clamping surface that has a configuration that accommodates and mates with the shape of the crossed-over fiber pairs 112 (such as having a curved recessed area) versus a flat clamping surface used to clamp horizontally layered flat fibers 12 such as shown in FIG. 1.

Also, in some embodiments, a single clip 132 may be used for both crossed-over fiber pairs 112 and horizontally layered fibers 12. As noted above, such a single clip 132 may include an adhesive foam pad 33 underside of the clip. Even though the clip 132 may have been molded with a recessed area thereunder for mating with the shape of the crossed-over fiber pairs 112, with the use of an adhesive foam pad 33 (shown in FIG. 9A), the clip 132 can still provide a flat surface to restrain horizontally layered fibers 12. If the clip 132 is used with crossed-over fiber pairs 112, the foam pad 33 can be further pressed to conform to the recessed configuration at the underside of the clip 132 to restrain the crossed-over fiber pairs 112.

Now referring to FIGS. 24-31, an example method and tooling for forming a fiber optic array 210 similar to that shown in FIGS. 1 and 23 is illustrated. However, the array 210 formed by the method illustrated in FIGS. 24-31 is an example of an array that can form a part of a flexible optical circuit 200 as discussed above. The array 210 formed by the method illustrated in FIGS. 24-31 is provided as a preform that can be further processed into a flexible optical circuit 200 by, for example, securing the formed array 210 between two polymeric sheets. FIG. 32 shows an example of a flexible optical circuit 200 formed from the array 210 manufactured by the inventive method and tooling illustrated in FIGS. 24-31.

Figure 24:
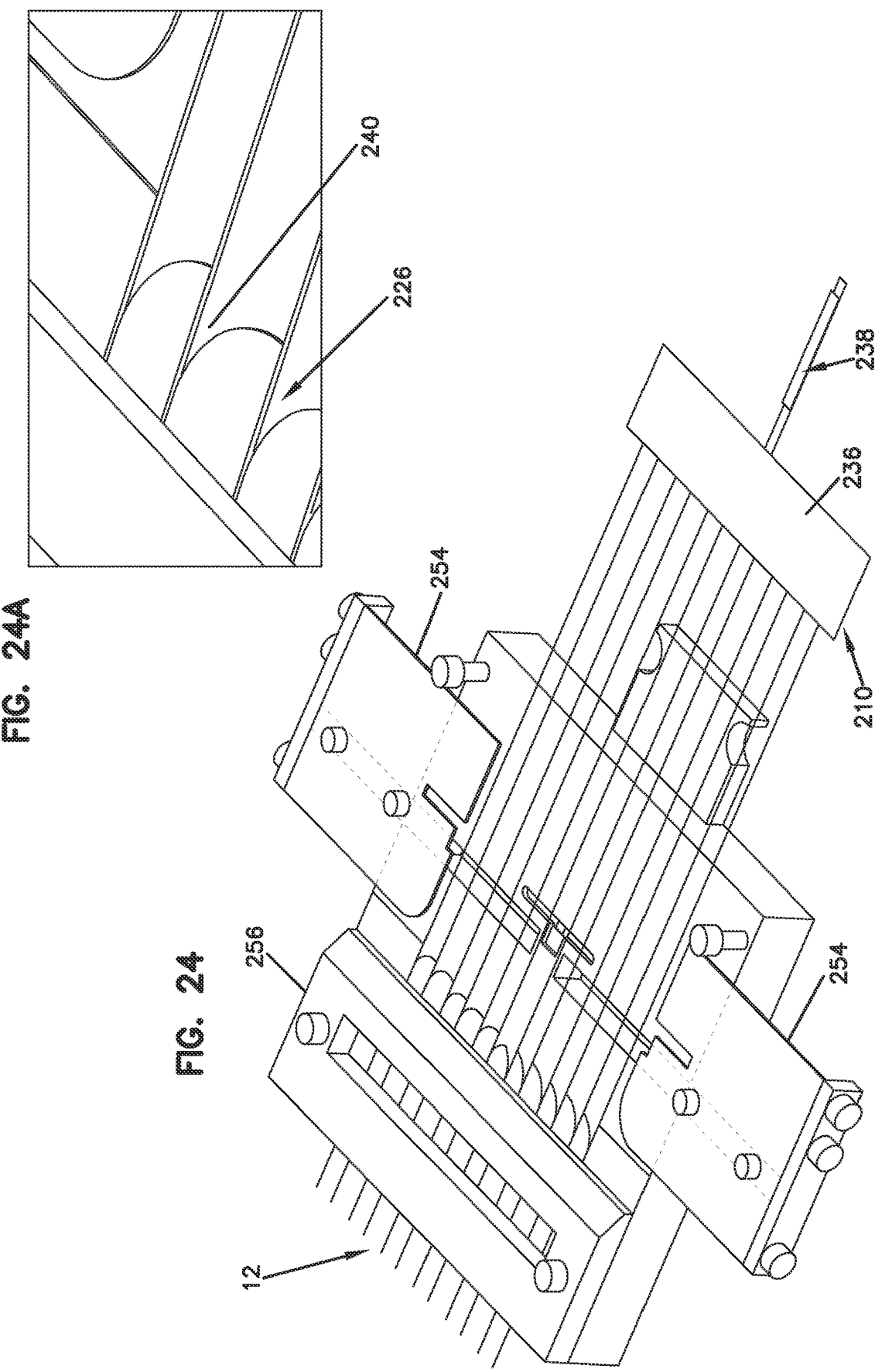

Now referring to FIG. 24, the fixture 244 for forming the array 210 is shown. Similar to fixture 44, the fixture 244 defines a base 242 having a front end 246, a rear end 248, and a bearing surface 250 extending therebetween against which the fibers 12 can be laid. Unlike the base 42 shown in FIGS. 1-23, the base 242 defines channels 226 adjacent the front end 246 that are formed integrally therewith.

The channels 226 define curved portions 240 at rear ends thereof for transitioning the fibers 12 from the channels 226, wherein the fibers 12 are at a spaced-apart arrangement, to a consolation point 228 on the base 242, wherein the fibers 12 are provided in a consolidated arrangement with the fibers 12 layered next to each other for further ribbonizing. FIG. 24A is a close-up view illustrating the curved portions 240 of the channels 226.

Figure 25:
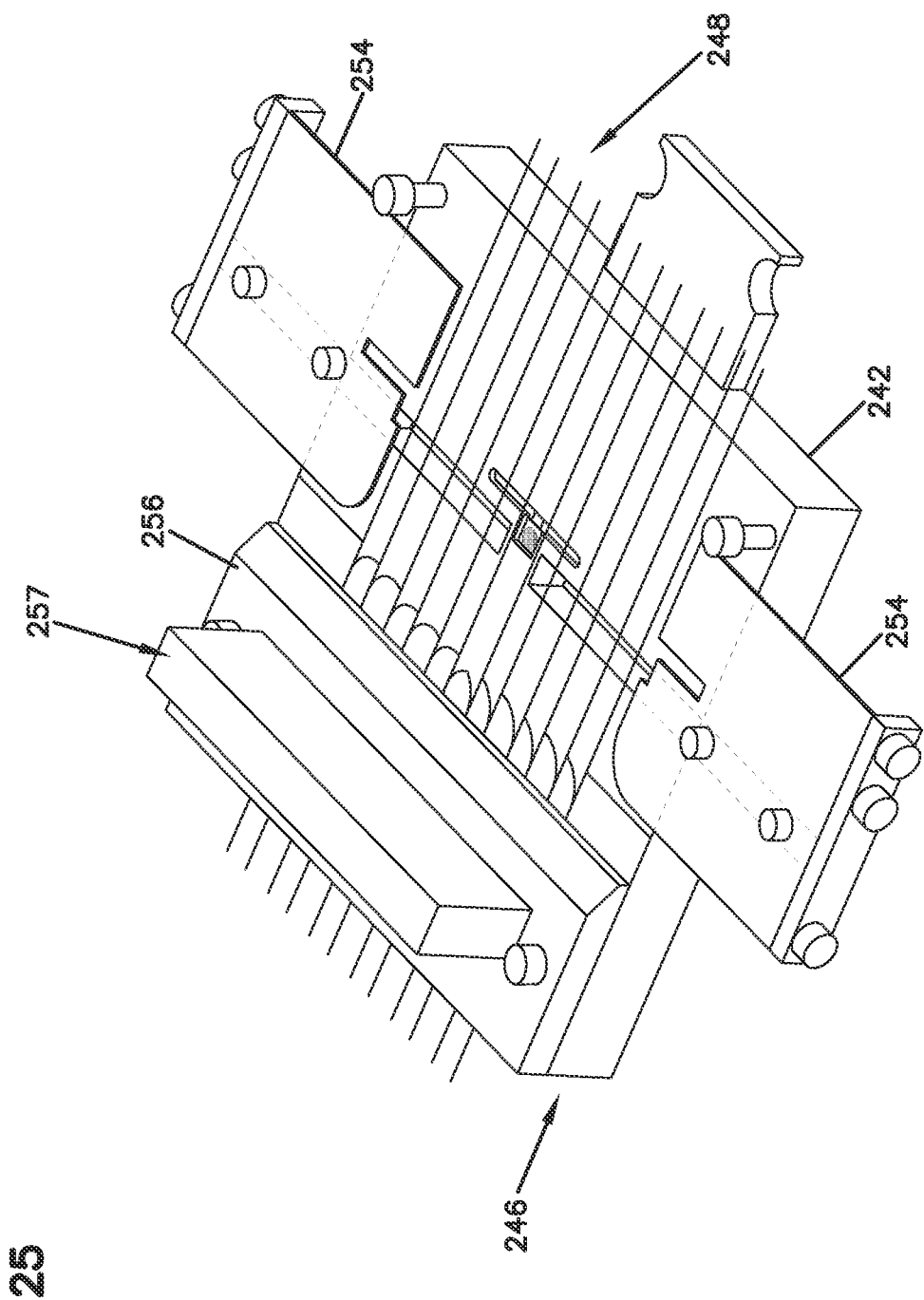
Figure 26:
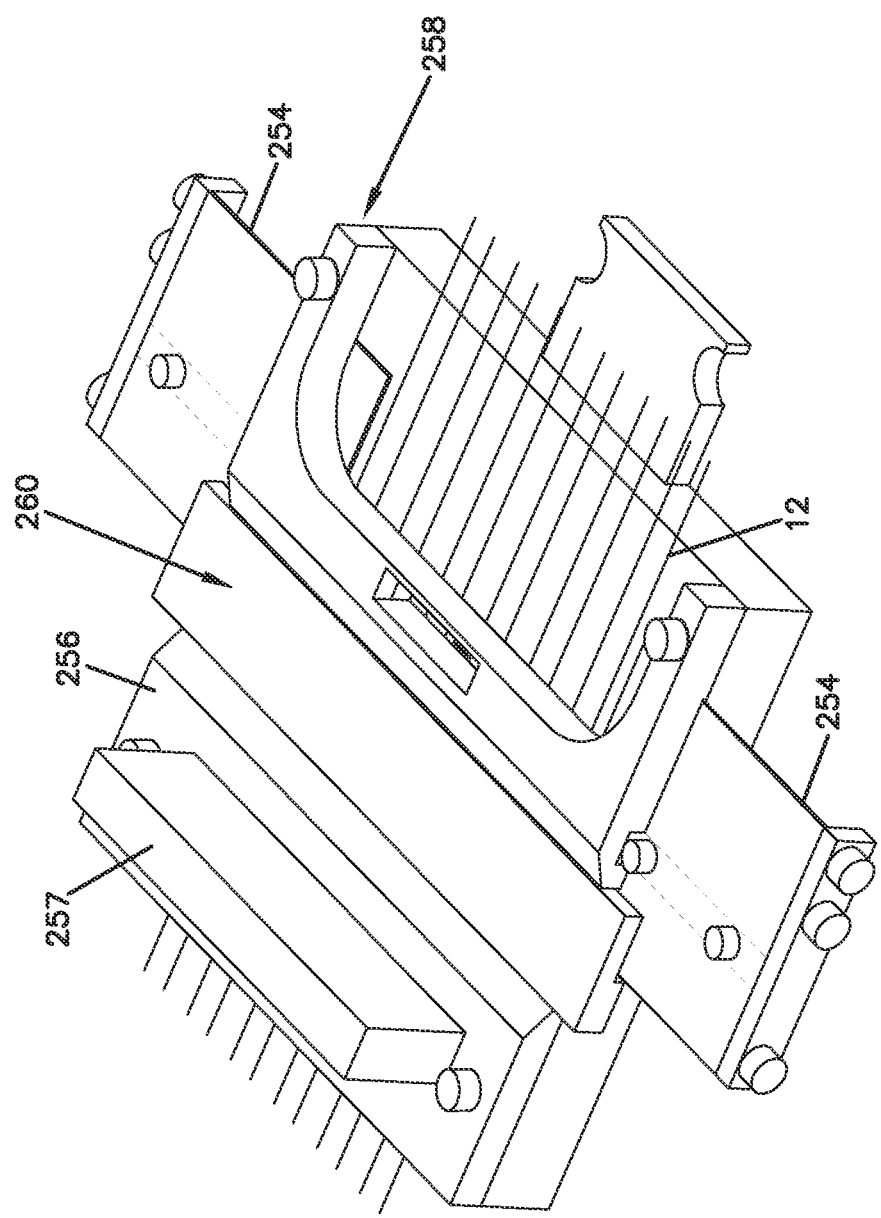

Now referring to FIGS. 25-26, once the fibers 12 are laid within the channels 226 of the base 242, a first clamp 256 is mounted adjacent the front end 246 of the base 242 for keeping the fibers 12 within the channels 226. A weight 257 may also be used to clamp the fibers 12 in place temporarily. A second clamp 258 is applied adjacent the rear end 248 of the base 242 for keeping the fibers 12 against the bearing surface 250 thereof, and a temporary cover 260 is placed between the first and second clamps 256, 258.

Figure 27:
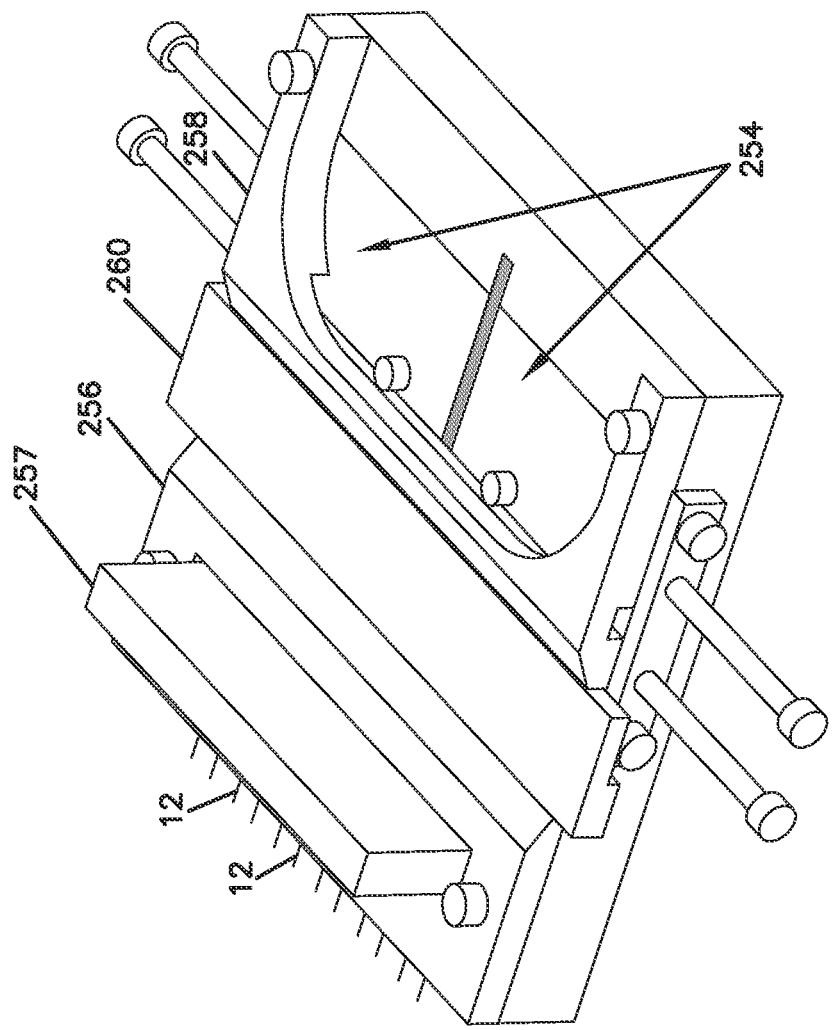

As shown in FIGS. 27-28, once contact blades 254 of the fixture 244 are slidably moved to consolidate the fibers 12, the temporary cover 260 may be removed. Similar to the functionality of the guide clamp 60 used in the method of FIGS. 1-23, the temporary cover 260 defines a space 262 for positioning a first piece of adhesive tape 236 on the fibers 12. The space 262 is illustrated in a close-up view in FIG. 28A.

Figure 29:
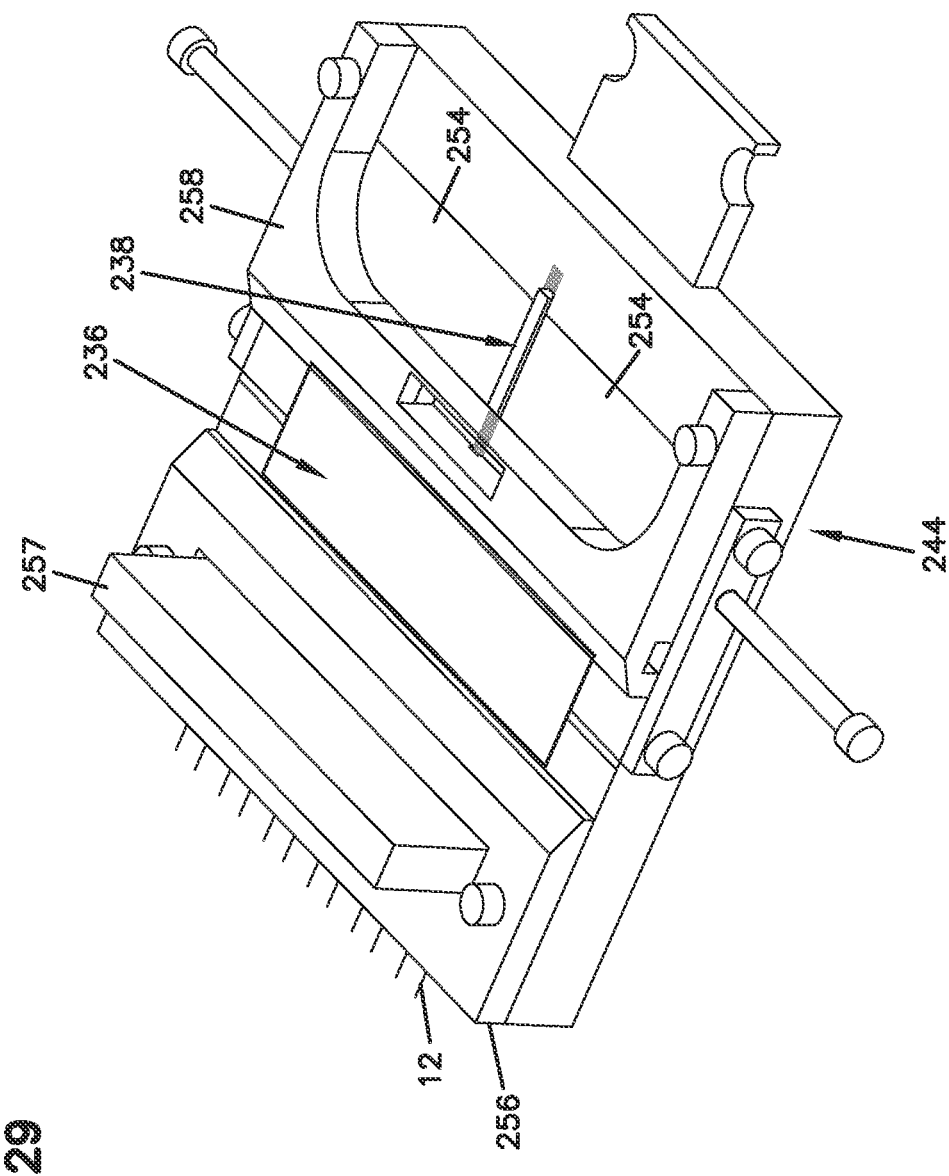

As shown in FIG. 29, the first piece of adhesive tape 236 is applied on the fibers 12 at the space 262, and a second piece of tape 238 is applied at the consolidated portion 229. Unlike the arrays 10/110 illustrated in FIGS. 1-23, the first and second pieces of tape 236, 238 are applied only to the fibers 12 (not to a separate substrate structure 16) and are primarily used to keep the fibers 12 in the arrangement formed by the fixture 244.

Figure 30:
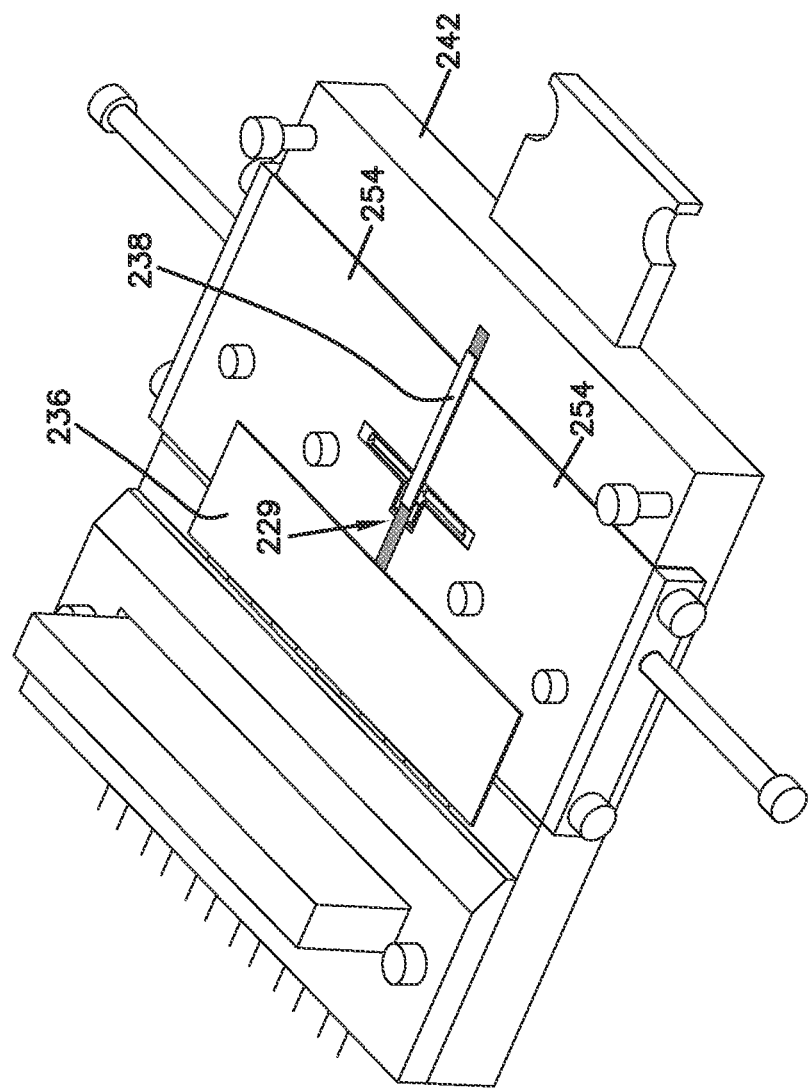

Next, as shown in FIGS. 30-31, the second clamp 258 is removed from the base 242 and the contact blades 254 are slidably moved apart. The fiber optic array 210 may be removed from the fixture 244 by peeling the pieces of tape 236, 238 from the fixture 244 and pulling on the consolidated portion 229 of the array 210 in a rearward direction. As the array 210 is pulled, the next array 210 is started (as shown in FIG. 24). The fibers 12 that extend forwardly from the first piece of adhesive tape 236 are cut at the desired length and are ready for a termination process as discussed above. Various surfaces of the fixture 244, such as the bearing surface 250 and surfaces of the blades 254, may be Teflon® coated to facilitate peeling of the pieces of tape 236, 238.

FIG. 32 illustrates an example of a flexible optical circuit 200 formed from the array 210 manufactured by the inventive method and tooling illustrated in FIGS. 24-31. As noted above, the array 210 formed by the tooling and method of FIGS. 24-31 may serve as a preform that can be further processed into the flexible optical circuit 200 shown in FIG. 32. The first and second pieces of tape 236, 238 may be used to temporarily hold the fibers 12 at the desired orientation before the fibers 12 are secured between two polymeric flexible sheets to form the flexible optical circuit 200. The pieces of tape 236, 238 may be trimmed to the required profile before or after the placement of the fibers 12 within the flexible polymeric substrates/sheets that form the flexible optical circuit 200. It should be noted that in other embodiments, the first and second pieces of adhesive tape 236, 238 may themselves define or be part of the polymeric substrates used to form the flexible optical circuit 200.

If crossing-over of the fibers 12 is required for the circuitry of the array to be formed, a second clamp similar to the second clamp 58 shown in FIGS. 12-17 using vertical pins 70 may be utilized.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

PARTS LIST 10 fiber optic array
12 fiber
14 termination
16 substrate/insert
18 ferrule
20 ferrule hub
22 front end of substrate
24 rear end of substrate
26 channel
28 fiber consolidation point
30 fiber clamp
32 clip
33 foam pad
34 opening
36 first piece of adhesive tape
38 second piece of adhesive tape
40 curved portion of channel
42 base
44 fixture
46 front end of base
48 rear end of base
50 bearing surface
52 insert cavity
54 contact blades
56 first clamp
58 second clamp
60 guide clamp
62 first space
64 opening
66 second space
68 pocket
70 vertical pin
110 fiber optic array
112 fiber pair
114 cross-over point
132 clip
200 flexible optical circuit
210 fiber optic array
226 channel
228 consolidation point
229 consolidated portion of array
236 first piece of adhesive tape
238 second piece of adhesive tape
240 curved portion of channel
242 base
244 fixture
246 front end of base
248 rear end of base
250 bearing surface
254 contact blades
256 first clamp
257 weight
258 second clamp
260 temporary cover
262 space

What is claimed is:

1. A fiber optic array, comprising:
a plurality of optical fibers, each optical fiber including a buffer tube portion surrounding the optical fiber;
a substrate for supporting the plurality of optical fibers, the substrate defining a first end and a second end and a first outer edge and a second outer edge perpendicular to the first and second ends; and
a plurality of spaced-apart channels defined by the substrate, the channels defining parallel portions at the first end of the substrate and a fiber clamp provided at the second end of the substrate, the spaced-apart channels provided in a stacked arrangement extending from the first outer edge to the second outer edge, wherein the spaced-apart channels define open top ends for receiving the optical fibers therein such that the parallel portions of the channels defined at the first end of the substrate are sized to frictionally receive and secure the buffer tube portions of the optical fibers without an additional structure covering top sides of the optical fibers;
wherein the plurality of optical fibers are positioned on the substrate such that the optical fibers extend from being spaced-apart via the channels to a consolidated arrangement wherein the fibers are layered next to each other, the fiber clamp securing the consolidated fibers at the second end of the substrate, and wherein the plurality of optical fibers are positioned within the spaced-apart channels such that a majority of each optical fiber is uncovered along a length thereof as the optical fibers extend from the first end to the second end of the substrate.

2. A fiber optic array according to claim 1, wherein the substrate is an insert configured to be removably placed within a fiber optic cassette.

3. A fiber optic array according to claim 1, wherein the substrate is a one-piece substrate.

4. A fiber optic array according to claim 3, wherein the plurality of spaced-apart channels are formed integrally with the one-piece substrate as a unitary structure.

5. A fiber optic array according to claim 1, wherein the parallel portions of the spaced-apart channels at the first end of the substrate are straight parallel portions, wherein the spaced-apart channels also define curved rear portions for transitioning the optical fibers from the straight parallel portions inwardly away from the first and second outer edges toward a central portion of the substrate with minimum bend radius protection.

6. A fiber optic array according to claim 1, wherein the substrate is configured such that the optical fibers at the channels extend outwardly from the channels to an exterior of the substrate to form pigtails that are terminated with fiber optic ferrules, wherein the substrate is configured to position the optical fibers therein such that the entirety of each of the fiber optic ferrules extends out past the first end of the substrate.

7. A fiber optic array according to claim 1, wherein the fiber clamp is defined by a clip that is snap-fit interlocked to the substrate.

8. A fiber optic array according to claim 1, wherein the optical fibers supported by the substrate are further secured to the substrate via at least one piece of adhesive tape.

\* \* \* \* \*